United States Patent
Middleton et al.

(10) Patent No.: US 10,826,729 B1
(45) Date of Patent: Nov. 3, 2020

(54) COMMUNICATION SYSTEM WITH ADJUSTABLE EQUALIZATION LEVELS AND RELATED METHODS

(71) Applicant: EAGLE TECHNOLOGY, LLC, Melbourne, FL (US)

(72) Inventors: Charles F. Middleton, Rockledge, FL (US); Elliott J. Grafer, Melbourne Beach, FL (US); George William Miles, IV, Rockledge, FL (US); John Richard Desalvo, Satellite Beach, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/516,480

(22) Filed: Jul. 19, 2019

(51) Int. Cl.
| | |
|---|---|
| *H04B 10/00* | (2013.01) |
| *H04L 25/03* | (2006.01) |
| *H04B 10/70* | (2013.01) |
| *H04B 10/50* | (2013.01) |
| *H04L 7/00* | (2006.01) |
| *H04B 10/2575* | (2013.01) |

(52) U.S. Cl.
CPC ... *H04L 25/03159* (2013.01); *H04B 10/2575* (2013.01); *H04B 10/5057* (2013.01); *H04B 10/70* (2013.01); *H04L 7/0075* (2013.01)

(58) Field of Classification Search
CPC .................. H04B 10/2575; H04B 10/5057
See application file for complete search history.

(56) References Cited

U.S. PATENT DOCUMENTS

| | | | | |
|---|---|---|---|---|
| 5,695,155 A | * | 12/1997 | Macdonald | B64D 15/20 244/134 F |
| 5,699,179 A | | 12/1997 | Gopalakrishnan | |
| 5,710,651 A | | 1/1998 | Logan, Jr. | |
| 5,870,216 A | * | 2/1999 | Brock | H04B 7/18504 398/49 |

(Continued)

FOREIGN PATENT DOCUMENTS

CN 104330939 11/2014

OTHER PUBLICATIONS

U.S. Appl. No. 15/958,397, filed Apr. 20, 2018 Middleton et al.
(Continued)

*Primary Examiner* — David C Payne
*Assistant Examiner* — Pranesh K Barua
(74) *Attorney, Agent, or Firm* — Allen, Dyer, Doppelt + Gilchrist, P.A.

(57) ABSTRACT

A communication system may include an RF source configured to generate a swept frequency RF signal, and a photonic local unit coupled to the RF source and configured to generate a modulated optical carrier signal based upon the swept frequency RF signal. The photonic local unit may have adjustable equalization levels. The communication system may include a photonic remote unit configured to generate a demodulated swept frequency RF signal from the modulated optical carrier signal from the photonic local unit, and an optical fiber path connecting the photonic local unit and the photonic remote unit. The communication system may include feedback circuitry cooperating with the optical fiber path to set the adjustable equalization levels of the photonic local unit based upon the demodulated swept frequency RF signal at the photonic remote unit.

24 Claims, 20 Drawing Sheets

(56) References Cited

U.S. PATENT DOCUMENTS

| | | | |
|---|---|---|---|
| H1791 H | 3/1999 | Williams | |
| 6,304,369 B1 | 10/2001 | Piehler | |
| 6,341,021 B1* | 1/2002 | Wilner | H04B 10/2507 398/79 |
| 6,353,490 B1* | 3/2002 | Singer | H04B 10/271 348/E7.07 |
| 6,366,379 B1* | 4/2002 | Terahara | H04B 10/077 359/308 |
| 6,381,047 B1* | 4/2002 | Frigo | H04B 10/506 398/79 |
| 6,417,957 B1* | 7/2002 | Yao | H04B 10/25758 250/227.11 |
| 6,452,714 B1* | 9/2002 | Rollins | G02F 2/00 359/259 |
| 6,535,328 B2 | 3/2003 | Yao | |
| 6,600,593 B2 | 7/2003 | Pedersen | |
| 6,671,465 B1* | 12/2003 | Cohen | H04B 10/504 398/140 |
| 7,394,331 B2 | 7/2008 | Yeung et al. | |
| 7,623,797 B2 | 11/2009 | Crivelli et al. | |
| 7,813,654 B1* | 10/2010 | Ng | H04B 10/58 398/198 |
| 7,877,020 B1 | 1/2011 | Hayes et al. | |
| 8,538,270 B2 | 9/2013 | Seidel et al. | |
| 8,842,992 B2* | 9/2014 | Middleton | H04B 10/00 398/115 |
| 9,002,207 B1* | 4/2015 | Karras | H04B 10/11 398/115 |
| 9,219,984 B1* | 12/2015 | Amir | H04W 4/021 |
| 9,755,754 B2* | 9/2017 | Schaefer | H04B 10/548 |
| 9,923,631 B1* | 3/2018 | Moilanen | G01M 11/39 |
| 9,967,031 B1 | 5/2018 | Middleton et al. | |
| 10,038,503 B2* | 7/2018 | Lesea | H04B 10/58 |
| 10,069,568 B1 | 9/2018 | Middleton et al. | |
| 10,135,544 B1 | 11/2018 | Klee et al. | |
| 2004/0095995 A1* | 5/2004 | Matreci | H04L 27/364 375/224 |
| 2004/0136649 A1 | 7/2004 | Mangir et al. | |
| 2006/0067699 A1* | 3/2006 | Chandrasekhar | H04B 10/2513 398/147 |
| 2007/0104490 A1* | 5/2007 | Ghiasi | H04B 10/25137 398/159 |
| 2009/0232191 A1* | 9/2009 | Gupta | H04B 10/40 375/216 |
| 2009/0297142 A1* | 12/2009 | Szafraniec | G01J 3/433 398/25 |
| 2010/0021166 A1* | 1/2010 | Way | H04J 14/0256 14/256 |
| 2010/0124418 A1* | 5/2010 | Noble | H04B 10/0779 398/9 |
| 2010/0247105 A1* | 9/2010 | Yu | H04B 10/25758 398/116 |
| 2012/0063771 A1* | 3/2012 | Sugaya | H04B 10/294 398/26 |
| 2013/0202307 A1* | 8/2013 | Middleton | H01Q 3/2676 398/115 |
| 2014/0119746 A1* | 5/2014 | Kalogerakis | H04B 10/616 398/210 |
| 2014/0248050 A1* | 9/2014 | Crilly, Jr. | H04B 10/25758 398/38 |
| 2015/0147066 A1* | 5/2015 | Benjamin | H04B 10/25759 398/116 |
| 2016/0112142 A1* | 4/2016 | Chang | H04B 10/6971 398/209 |
| 2016/0164703 A1* | 6/2016 | Stone | H04L 25/03159 398/140 |

OTHER PUBLICATIONS

U.S. Appl. No. 16/280,182, filed Feb. 20, 2019 Middleton et al.

Stern et al. "Tunable sharp and highly selective microwave-photonic band-pass filters based on stimulated Brillouin scattering," Photon. Res: vol. 2 No. 4. Aug. 2014; pp. B18-B25.

Marpaung et al. "Low-power, chip-based stimulated Brillouin scattering microwave photonic filter with ultrahigh selectivity" Optica: vol. 2, No. 2, Feb. 2015; pp. 76-83.

Ge et al "Passband switchable microwave photonic multiband filter" Sci. Rep: Nov. 2, 2015;5; Abstract Only.

Song et al. "Reconfigurable and tunable flat-top microwave photonic filters utilizing optical frequency combs." IEEE Photonics Technology Letters: vol. €23 No. 21, Nov. 1, 2011; 1618-1620.

Zhang et al. "Microwave photonic filter with reconfigurable and tunable bandpass response using integrated optical signal processor based on microring resonator" €Optical Engineering:€52.12, Dec. 16, 2013; Abstract Only.

Zhang et al. "Tunable and reconfigurable bandpass microwave photonic filters utilizing integrated optical processor on silicon-on-insulator substrate" IEEE Photonics Technology Letters: vol. 24 No. 17; 2012; Abstract Only.

Thorlabs "980 nm, Single Mode Fused Fiber Optic Couplers / Taps" https://www.thorlabs.com/newgrouppage9.cfm?objectgroup_id=8469; Retrieved from internet Jun. 12, 2019; pp. 5.

Li et al. "Microwave Photonic Signal Processing and Sensing Based on Optical Filtering" Appl. Sci. 2019, 9, 163; www.mdpi.com/journal/applsci: pp. 12.

Mattia Pagani "Microwave photonic signal processing using on-chip nonlinear optics" https://ses.library.usyd.edu.au/bitstream/2123/14450/2/pagani_m_thesis.pdf: 2016; pp. 172.

Shi et al. "Generation and phase noise analysis of a wide optoelectronic oscillator with ultra-high resolution based on stimulated Brillouin scattering" Optics Express: vol. 26, No. 13; Jun. 25, 2018, pp. 12.

* cited by examiner

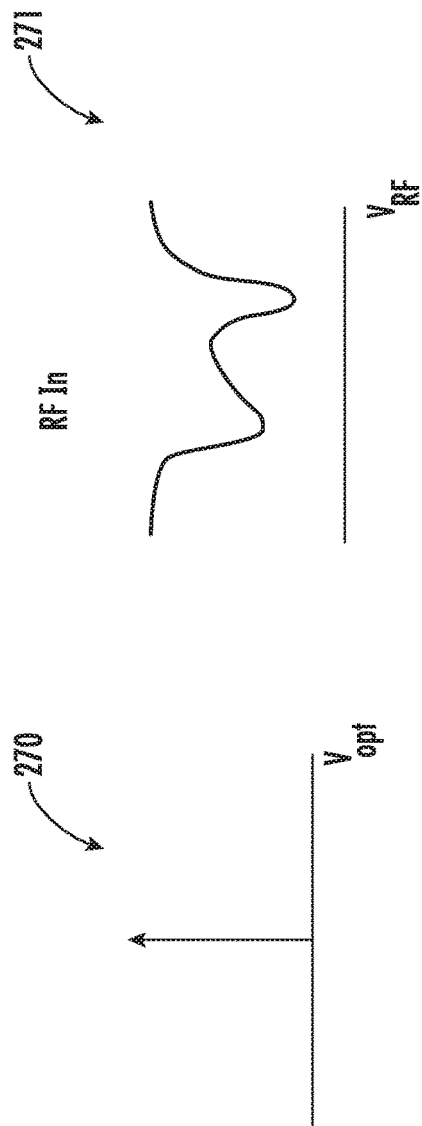
FIG. 13A
FIG. 13B
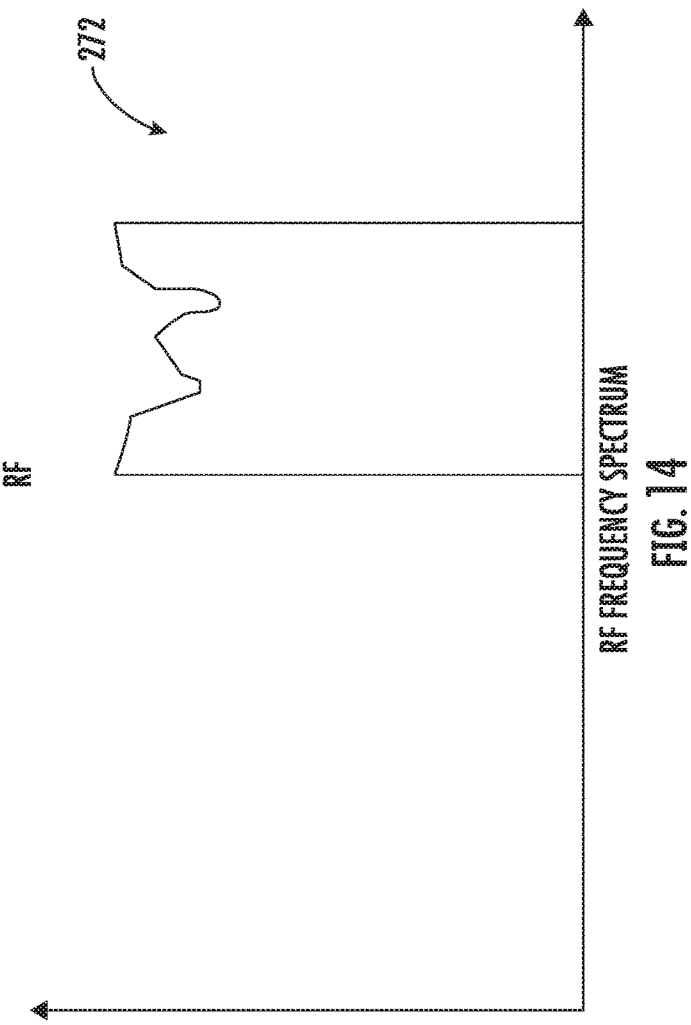
FIG. 14

COMMUNICATION SYSTEM WITH ADJUSTABLE EQUALIZATION LEVELS AND RELATED METHODS

TECHNICAL FIELD

This disclosure relates to radio frequency systems, and, more particularly, to radio frequency systems for communications, sensing, and other related fields and related methods.

BACKGROUND

Communication systems often exhibit frequency-dependent gain slope and ripple in their spectral responses. This non-uniform frequency response is inherent to all electronic components. However, other factors can exacerbate the frequency response. For example, these include impedance mismatch, frequency dependent RF components and environmental effects.

Ripple and gain slope may ultimately cause errors in data transmission. As a result, a gain flatness metric is often specified for RF systems, for example. By way of example, a gain flatness of +/−1 dB may be desired for frequencies in a 500 MHz bandwidth centered at 10 GHz.

Accordingly, various equalization techniques are often implemented to flatten the frequency response. Typical analog electronic equalizers are static and generally provide an inverse gain slope to what the frequency response of the system is. However, some implementations use dynamic analog electronic equalizers, which are active systems designed to correct voltage standing wave ratio (VSWR) as well as gain slope.

One example equalizer is set forth in U.S. Pat. No. 7,394,331 to Yeung et al., which discloses a programmable passive equalizer. The equalizer is programmable to respond to one or more changes in a signal caused by the communication of the signal through various signal components. The passive equalizer includes a programmable resistor device and a programmable capacitor device arranged in parallel to one another, with the programmable resistor device and the programmable capacitor being arranged to provide an output to a node. An inductor device and a resistor device are arranged in series, with the inductor device and the resistor device also being configured to provide an output to the node.

Generally speaking, electronic equalizer approaches may suffer from various drawbacks. These may include added loss into the system, narrowband response, low resolution, and poor performance at high frequencies. As such, further enhancements may be desirable for signal equalization in various applications.

SUMMARY

Generally, a communication system may include a radio frequency (RF) source configured to generate a swept frequency RF signal, and a photonic local unit coupled to the RF source and configured to generate a modulated optical carrier signal based upon the swept frequency RF signal. The photonic local unit may have adjustable equalization levels. The communication system may comprise a photonic remote unit configured to generate a demodulated swept frequency RF signal from the modulated optical carrier signal from the photonic local unit, an optical fiber path connecting the photonic local unit and the photonic remote unit, and feedback circuitry cooperating with the optical fiber path to set the adjustable equalization levels of the photonic local unit based upon the demodulated swept frequency RF signal at the photonic remote unit.

The system may also include an RF antenna coupled to the photonic remote unit. The feedback circuitry may include an antenna feedback unit at the photonic remote unit and a local feedback unit at the photonic local unit. The antenna feedback unit may include an electro-optic (E/O) modulator configured to modulate an optical carrier signal based upon the demodulated swept frequency RF signal, and a Sagnac loop interferometer coupled to the E/O modulator and configured to generate an optical feedback signal by suppressing sidebands of the optical carrier signal. The antenna feedback unit may comprise an optical coupler coupled to respective loops of the Sagnac loop interferometer.

Also, the local feedback unit may comprise an optical power meter coupled to the photonic local unit. The local feedback unit may have a laser source configured to generate the optical carrier signal, and an optical circulator coupled between the laser source and the optical power meter. The optical fiber path may include a first optical fiber coupled between the optical coupler and the optical circulator and a second optical fiber coupled between the optical coupler and the optical power meter.

Moreover, the communication system may further comprise an amplifier coupled downstream from the photonic remote unit, and an RF coupler coupled downstream from the amplifier and configured to route the demodulated swept frequency RF signal to an RF antenna and the feedback circuitry. The photonic local unit may be configured to add an inverse of an RF system frequency response to an RF input signal.

Another aspect is directed to a communication system comprising an RF source configured to generate a swept frequency RF signal, and a photonic remote unit coupled to the RF source and configured to generate a modulated optical carrier signal based upon the swept frequency RF signal. The communication system may comprise a photonic local unit configured to generate a demodulated swept frequency RF signal from the modulated optical carrier signal from the photonic remote unit. The photonic local unit may have adjustable equalization levels. The communication system may comprise an optical fiber path connecting the photonic local unit and the photonic remote unit, and feedback circuitry cooperating with the optical fiber path to set the adjustable equalization levels of the photonic local unit based upon the demodulated swept frequency RF signal at the photonic local unit.

The feedback circuitry may comprise an E/O modulator configured to modulate an optical carrier signal based upon the demodulated swept frequency RF signal, and a Sagnac loop interferometer coupled to the E/O modulator and configured to generate an optical feedback signal by suppressing sidebands of the optical carrier signal. The feedback circuitry may comprise an optical coupler coupled to respective loops of the Sagnac loop interferometer.

The feedback circuitry may include an optical power meter coupled to the photonic local unit. The feedback circuitry may comprise a laser source configured to generate the optical carrier signal, and an optical circulator coupled between the laser source and the optical power meter.

Also, the communication system may comprise an amplifier coupled downstream from the RF source, and an RF coupler coupled downstream from the amplifier and configured to route the swept frequency RF signal to the photonic remote unit. The photonic local unit may be configured to add an inverse of an RF system frequency response to an RF input signal. The photonic local unit may be configured to transmit timing and synchronization data for the swept frequency RF signal to the RF source.

Yet another aspect is directed to a method of operating a communication system. The method may comprise generating a swept frequency RF signal using an RF source, and generating a modulated optical carrier signal based upon the swept frequency RF signal using a photonic local unit coupled to the RF source. The photonic local unit may have adjustable equalization levels. The method may comprise generating a demodulated swept frequency RF signal from the modulated optical carrier signal from the photonic local unit using a photonic remote unit. An optical fiber path may connect the photonic local unit and the photonic remote unit. The method may further include setting the adjustable equalization levels of the photonic local unit based upon the demodulated swept frequency RF signal at the photonic remote unit using feedback circuitry cooperating with the optical fiber path.

Another aspect is directed to a method of operating a communication system. The method may include generating a swept frequency RF signal using an RF source, and generating a modulated optical carrier signal based upon the swept frequency RF signal using a photonic remote unit coupled to the RF source. The method may comprise generating a demodulated swept frequency RF signal from the modulated optical carrier signal from the photonic remote unit using a photonic local unit. The photonic local unit may have adjustable equalization levels, and an optical fiber path may connect the photonic local unit and the photonic remote unit. The method may comprise setting the adjustable equalization levels of the photonic local unit based upon the demodulated swept frequency RF signal at the photonic local unit using feedback circuitry cooperating with the optical fiber path.

BRIEF DESCRIPTION OF THE DRAWINGS

FIGS. 13A-16B are a series of schematic diagrams and respective optical signal diagrams illustrating propagation of the input and pump signals through the RF frequency converter of FIG. 12.

DETAILED DESCRIPTION OF THE EMBODIMENTS

Figure 1:
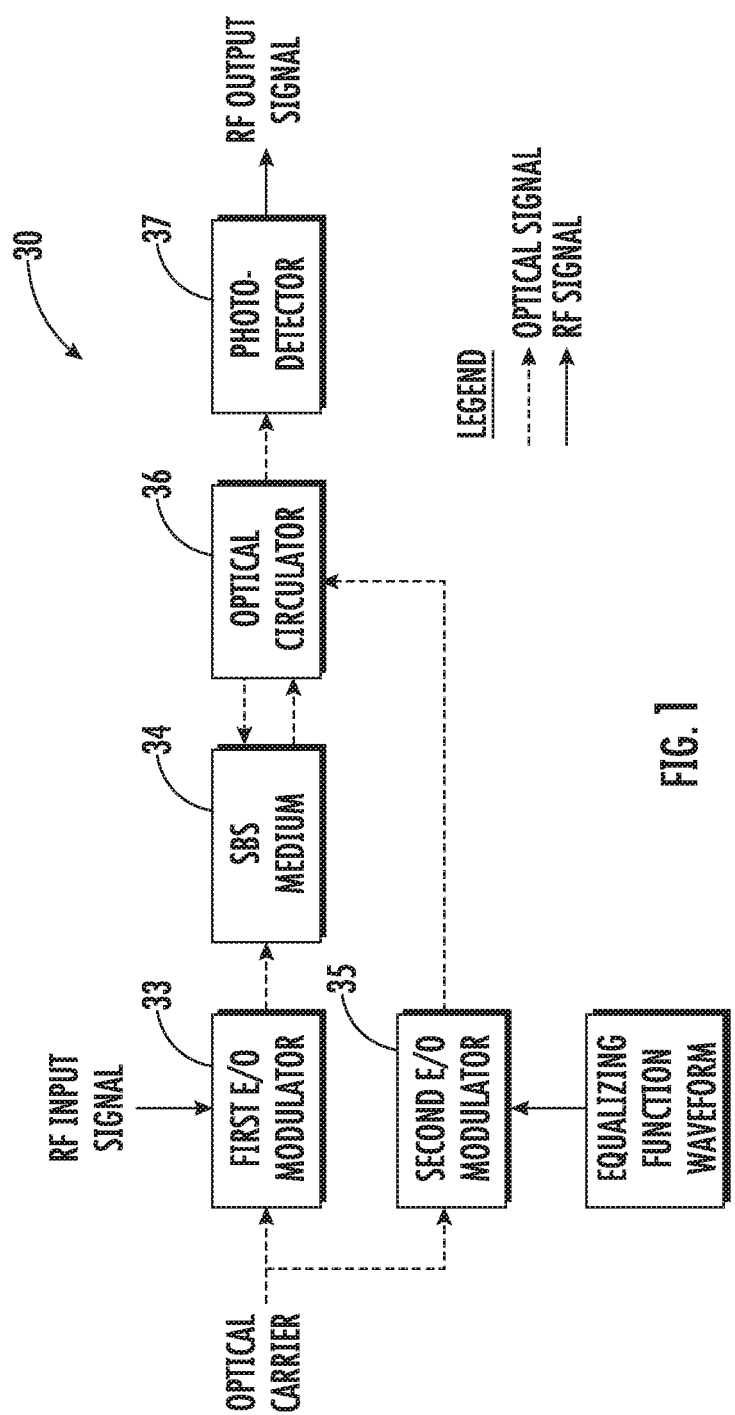
FIG. 1 is a schematic block diagram of an RF photonic equalizer, according to an example embodiment.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and base 100 reference numerals are used to indicate similar elements in alternative embodiments.

Figure 2:
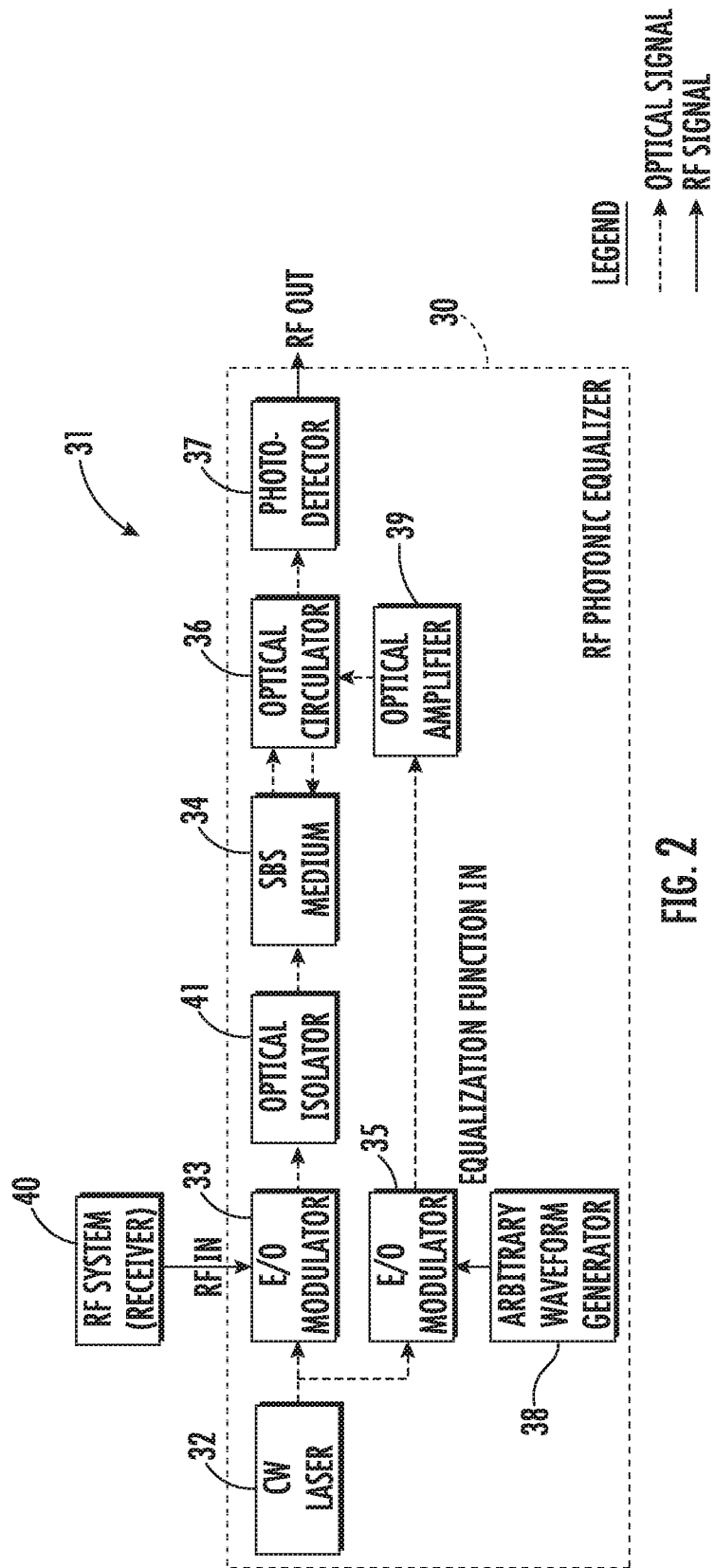
FIG. 2 is a more detailed schematic block diagram of an RF communication system including the RF photonic equalizer of FIG. 1.
Figure 3:
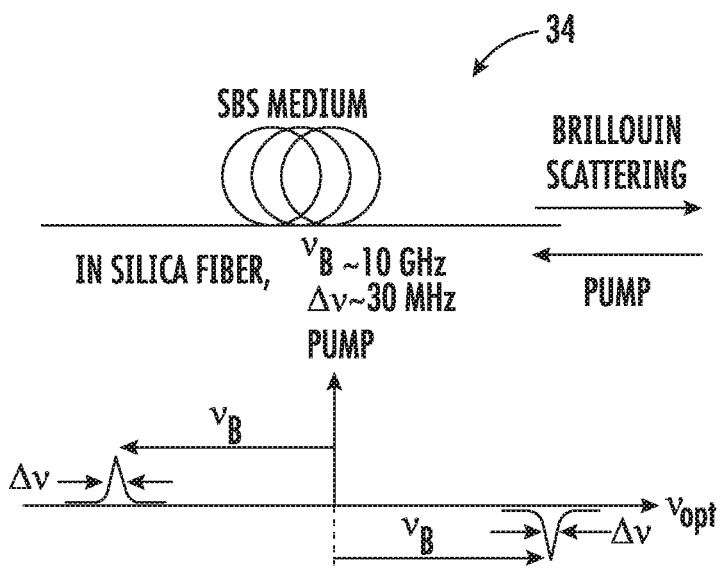
FIGS. 3-7 are a series of schematic diagrams and respective optical signal diagrams illustrating propagation of the input and pump signals through the SBS medium of the photonic equalizer of FIG. 1.
Figure 4:
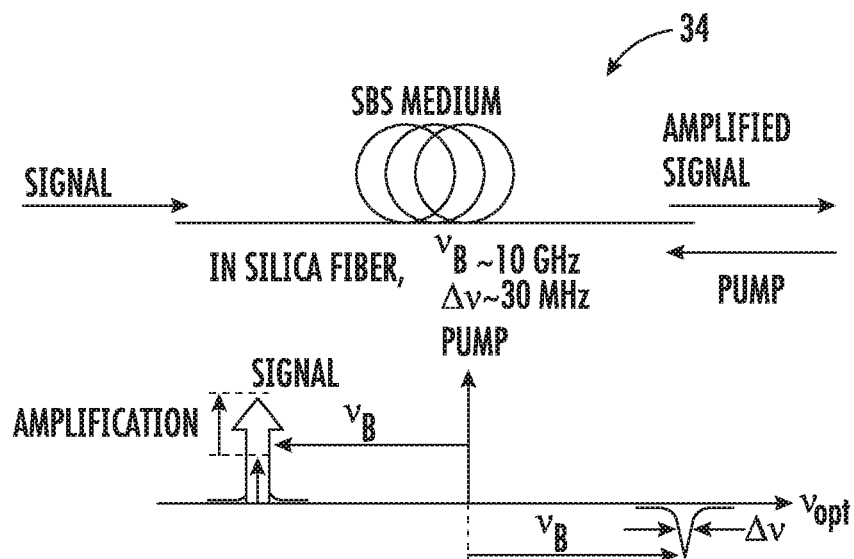
Figure 5:
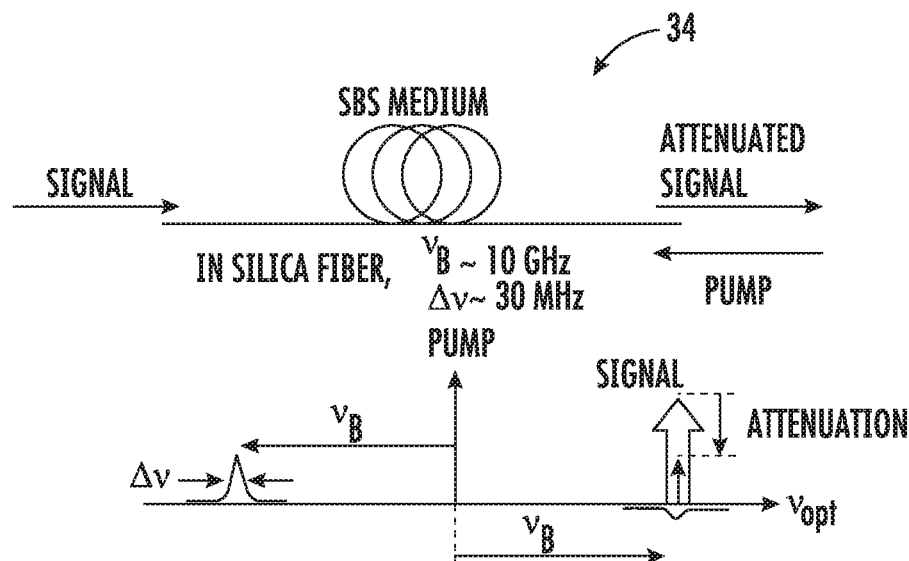
Figure 6:
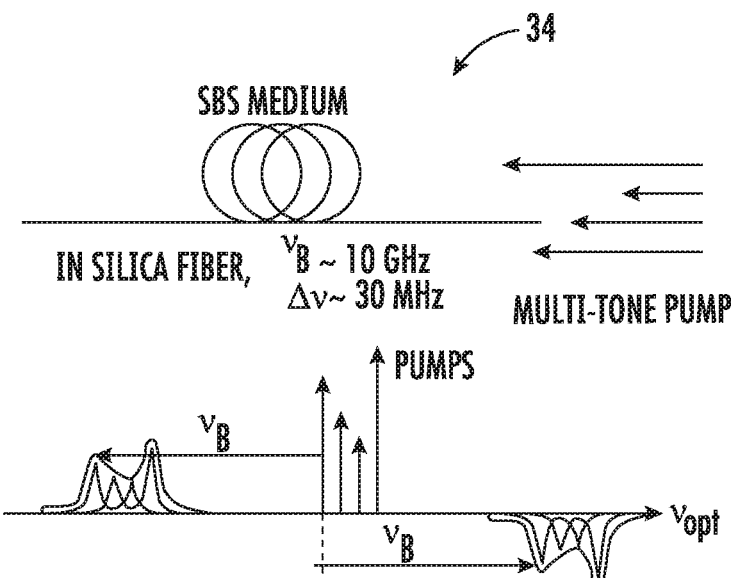
Figure 7:
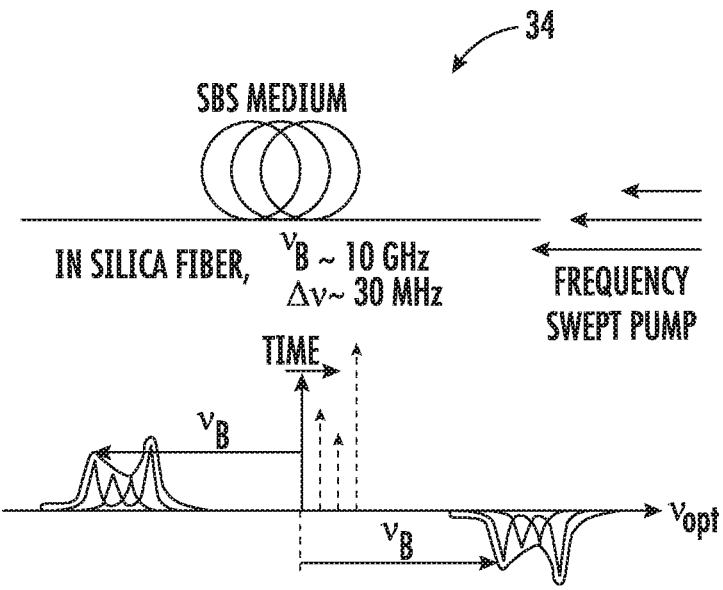

Referring initially to FIGS. 1 and 2, an RF photonic equalizer 30 and associated RF communication system 31 incorporating the RF photonic equalizer are first described. The RF photonic equalizer 30 advantageously applies a photonic equalizing technique based on SBS, a nonlinear optical effect that occurs above certain optical power levels in various media and provides frequency-specific gain or loss bands based on the optical frequency of an input pump signal. More particularly, the equalizer 30 illustratively includes an optical source, here a continuous-wave (CW) laser 32, which generates an optical carrier signal which may optionally be amplified by an optical amplifier (not shown), such as an erbium-doped fiber amplifier (EDFA). By way of example, the CW laser 32 may have a wavelength of 1550 nm, although other wavelengths may be used in different embodiments.

Light from the laser 32 may be divided along two paths by a power divider (not shown). The first path provides an input for a first electro-optic (E/O) modulator 33 configured to modulate the optical carrier based upon an RF input signal, such as from an RF system 40. In the illustrated example, the RF system 40 includes a receiver, but in some embodiments the RF system may also include a transmitter, for example. An SBS medium 34 is illustratively coupled to the first E/O modulator 33, and a second E/O modulator 35 is configured to modulate the optical carrier based upon an equalizing function waveform, as will be discussed further below. By way of example, one or more of the first and second E/O modulators 33, 35 may be Mach-Zehnder modulators. However, other types of E/O modulators may be used in different embodiments.

The equalizer 30 further illustratively includes an optical circulator 36 coupled to the SBS medium 34 and the second E/O modulator 35, and a photodetector 37 coupled to the optical circulator. In some embodiments, an optical isolator 41 may be coupled between the first E/O modulator 33 and the SBS medium 34. The photodetector 37 is configured to generate an RF output signal based upon the equalization function waveform applied to the RF input signal. In the example of FIG. 1, dashed arrows indicate optical signal flow and solid arrows represent RF signal flow.

More particularly, the RF photonic equalizer 30 may include a waveform generator 38 coupled to the second E/O modulator 35 and configured to generate the equalizing function waveform. In accordance with one example, the waveform generator 38 may be an arbitrary waveform generator (AWG) configured to dynamically vary the equalizing function waveform based upon an iterative algorithm, for example. The equalizing function waveform may be formed by combining one or more signals or tones at different frequencies, or a single tone that is frequency swept in time, to use as pump signals in the SBS medium 34. The waveform generator 38 may add an inverse of an RF system frequency response to the RF input signal as a pump signal via the optical circulator 36. The waveform generator 38 may be implemented with a field-programmable gate array (FPGA), application-specific integrated circuit (ASIC), etc.

The pump signal will provide a Brillouin-shifted gain bandwidth whose width is dependent on the SBS medium 34. By varying the pump signal(s), the width, frequency, and shape of the equalizing function waveform may accordingly be set by the waveform generator 38. Further details regarding SBS microwave photonic filtering may be found in D. Marpaung et al., "Low-power, chip-based stimulated Brillouin scattering microwave photonic filter with ultrahigh selectivity," Optica 2, 76-83 (2015), and Y. Stern et al., "Tunable sharp and highly selective microwave-photonic band-pass filters based on stimulated Brillouin scattering," Photon. Res. 2, B18-B25 (2014), which are hereby incorporated herein in their entireties by reference.

An optical amplifier 39 may also be included to boost the pump signal above an SBS threshold to create the desired SBS effect, as will be appreciated by those skilled in the art. As noted above, the optically modulated and amplified filter function signal is introduced to the RF signal path via the optical circulator 36, so that it propagates along the same path as the RF signal, but in the opposite direction. This is done to apply optical gain and loss to the spectral response using the SBS medium 34, as will now be discussed further with reference to FIGS. 3-7.

As the distorted RF signal is introduced to the SBS medium 34, so too is the counter-propagating pump signal to generate an attenuated or amplified signal at the input of the photodetector 37. A strong optical pump signal may scatter off an acoustic wave in the propagation medium generated by the pump itself. The acoustic wave acts as a moving grating, effectively leading to a Doppler shift of the scattered light. The scattered light is shifted by the Brillouin frequency (related to the acoustic velocity of the medium) and has a Lorentzian spectrum of bandwidth related to the acoustic wave lifetime of the medium. In silica based standard single mode fiber, the Brillouin frequency is typically ~10 GHz and bandwidth is ~30 MHz at full width half maximum. The aggregate bandwidth may be increased through a multiplicity of pumps or a single pump swept over frequency. Counter-propagating light resonant with the Stokes-shifted Brillouin spectrum may be amplified, while counter-propagating light resonant with the anti-Stokes spectrum may be attenuated. The amount of gain or loss depends on the SBS medium length and material characteristics, pump and probe powers, and relative polarization state of pump and probe.

Figure 8:
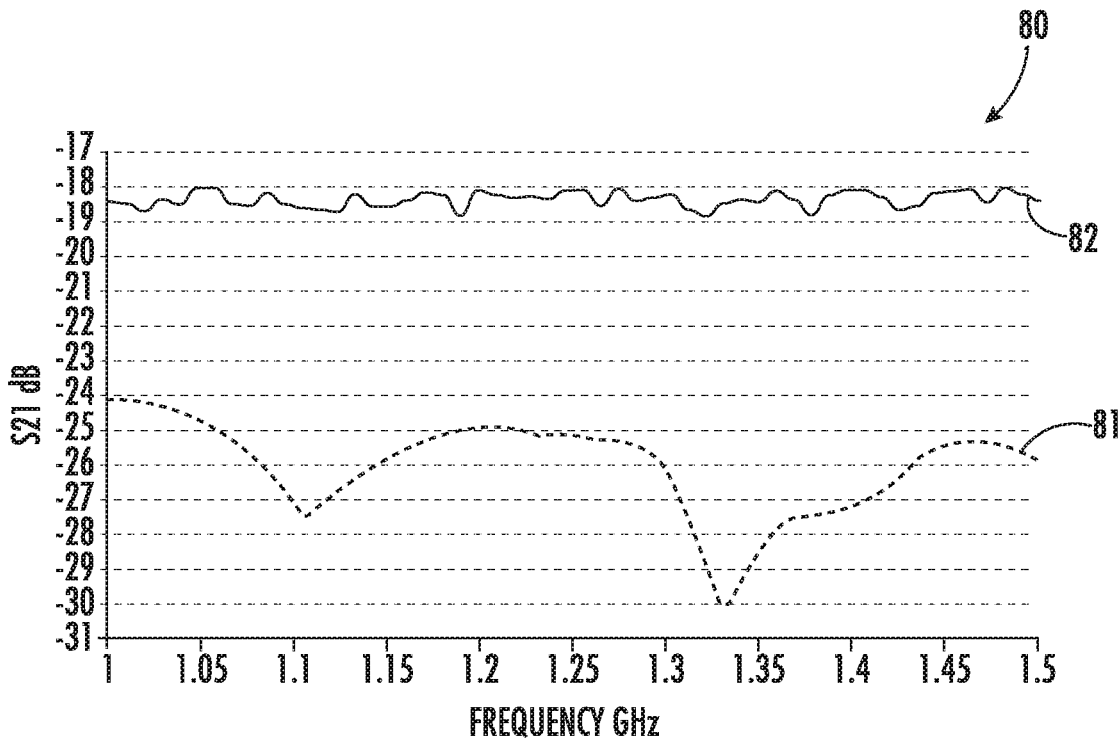
FIG. 8 is a graph including measured plots of RF spectrum output versus frequency before and after equalization using the RF photonic equalizer of FIG. 1, according to an example implementation.

An example RF signal equalization measurement using the above-described approach is demonstrated in the graph 80 of FIG. 8. In the illustrated example, the RF signal plot 81 corresponds to the original distorted RF signal with no SBS equalization applied. The RF signal plot 82 corresponds to the RF signal after equalization by the equalizer 30, which applies the above-described photonic equalization across the illustrated signal range. The resulting signal has a significantly flattened frequency response which advantageously provides a gain flatness within +/−1 dB.

Figure 9:
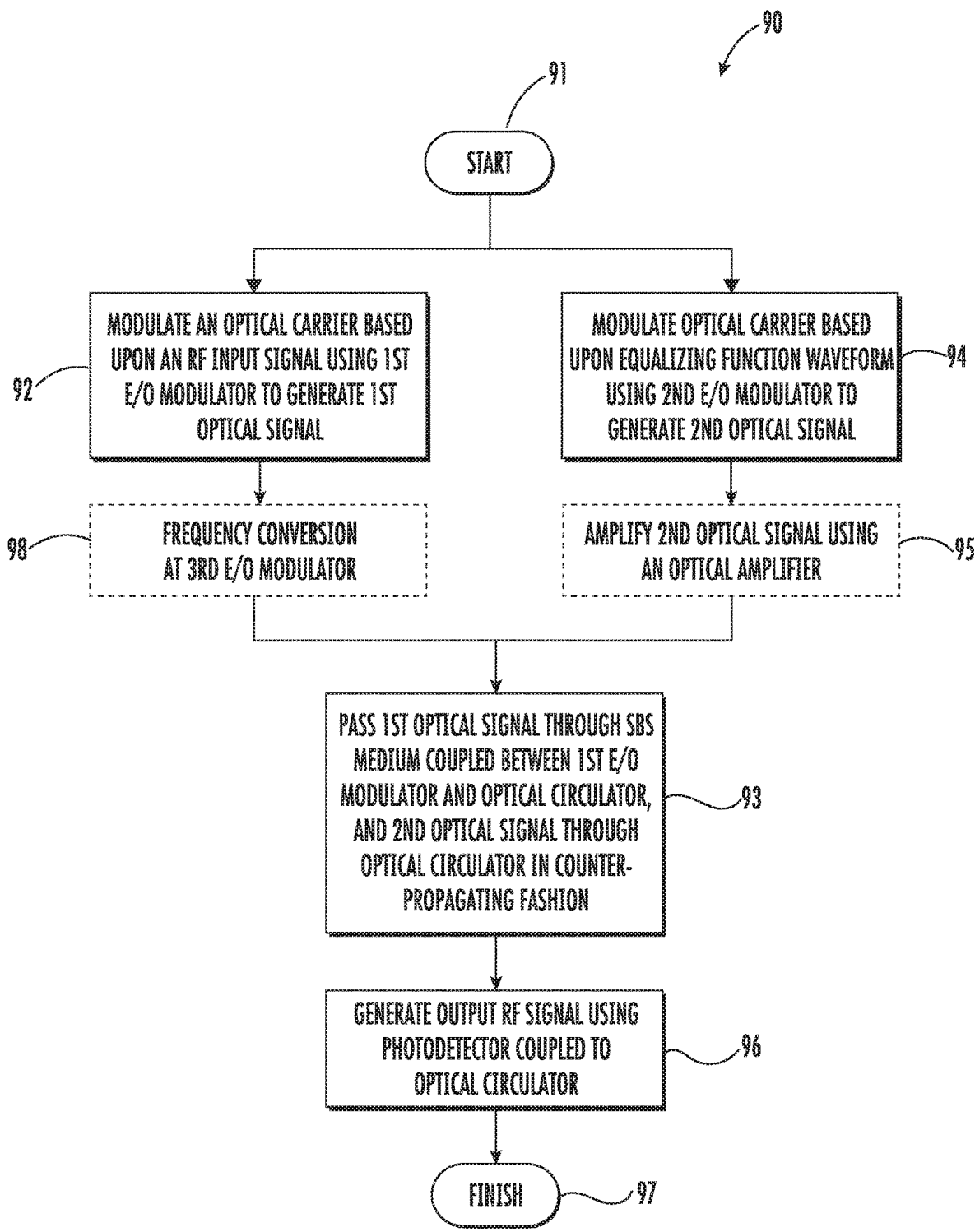
FIG. 9 is a flowchart illustrated method aspects associated with the RF photonic equalizer of FIG. 1.

Operation of the equalizer 30 will be further understood with reference to the flow diagram 90 of FIG. 9, which begins at Block 91. The CW laser 32 generates the optical carrier, which is optically split and fed into the E/O modulators 33, 35. The signal path modulator 33 converts the distorted electrical signal from the RF system 40 into the optical domain (Block 92), manifesting as optical sidebands off of the carrier. This signal passes through the optical isolator 36 and into the SBS gain medium 34, at Block 93, where the interaction of the RF input signal and the pump occur. The pump path modulator 35 performs the same E/O conversion on the arbitrarily generated equalization function waveform (Block 94), which is programmed to compensate for the distortion. This is (optionally) then optically amplified by the amplifier 39 (Block 95) to stimulate Brillouin scattering in the SBS medium 34, as noted above. The circulator 36 serves to counter-propagate the pump signal into the SBS medium 34 while the RF signal is passing in the propagating direction. The resulting SBS from the pump may be positioned in frequency to add optical gain or optical loss to the signal in the propagating direction, thus equalizing the signal. The optical signal is converted into an electrical signal via the photodetector 37, at Block 96, which illustratively concludes the method of FIG. 9 (Block 97).

The equalizer 30 advantageously provides for an arbitrarily configurable photonic system which adds the inverse of an RF system frequency response to provide an equalized total system frequency response. Yet, the equalizer 30 is an all analog equalizer that advantageously has a relatively high resolution (e.g., <30 MHz), wide operating bandwidth (e.g., DC-110 GHz), and wide instantaneous bandwidth (IBW) (e.g., >15 GHz). Moreover, the equalizer 30 is arbitrarily and dynamically reconfigurable, has significant amplitude adjustability (e.g., >50 dB), and may advantageously provide dynamic spectral manipulation at sub-microsecond timescales.

Figure 10:
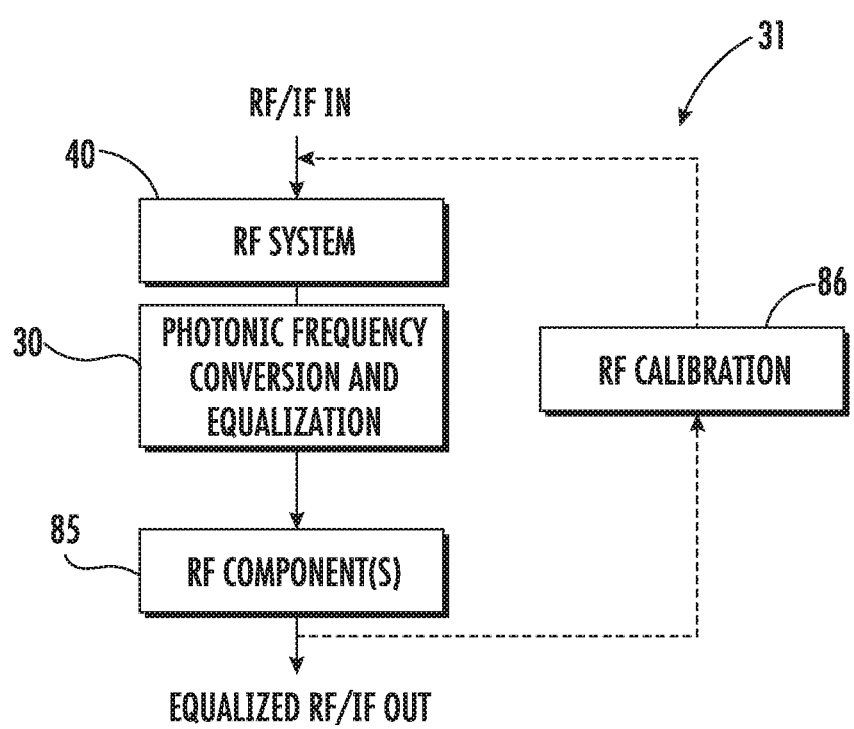
FIG. 10 is a schematic block diagram of another embodiment of the system of FIG. 2, according to an example implementation.

Another example implementation of the system 31 is shown in FIG. 10. In this configuration, equalization is performed based upon the output of one or more RF components 85 upstream or downstream from the RF photonic equalizer 30. By way of example, such RF components 85 may include cables, filters, amplifiers, etc. An RF calibration system or device 86, such as a network analyzer, may be coupled between the input to the RF system 40 and the output of the RF component(s) 85 as shown. By way of example, this may be done as a calibration step or during the manufacturing process, and the RF calibration device 86 may be removed before the system 31 is put into service, although in some embodiments an RF calibration device may also be used in the field as well.

A typical Extremely High Frequency (EHF), i.e. 30 to 300 GHz, communication system operating at this band may have some drawbacks. For example, transmission of the signals over coaxial cable may incur large attenuation effects. Moreover, in applications where RF devices are used, the size, weight, and power (SWaP) of the components may increase to undesirable levels. Moreover, downstream receiver processing, such as downconverting, and signal addressing may be difficult.

One approach to these drawbacks in EHF communication systems may comprise the use of optical components for processing components. An advantage of such systems is the ability to transmit EHF signals from a remote location without the degradation of the signal incumbent in RF applications.

For example, as disclosed in U.S. Pat. No. 5,710,651 to Logan, Jr., an EHF communication system comprises a remote antenna station, a transmitter/receiver station, and an optical fiber coupling the stations together. These stations comprise photodiodes for converting the transmitted optical signal to an electrical signal, and lasers paired with optical modulators for converting the received EHF signal to an optical signal.

Also, in EHF applications, it may be helpful to provide gain equalization that can be dynamically reconfigured. Such an equalizer would need to be rapidly configured, tunable over a wide frequency range, and adjustable in both the center frequency and bandwidth. Moreover, in some EHF frequency conversion applications, gain flatness requirements may be difficult to achieve with typical approaches. The present disclosure provides an approach to these issues in the following.

Figure 11:
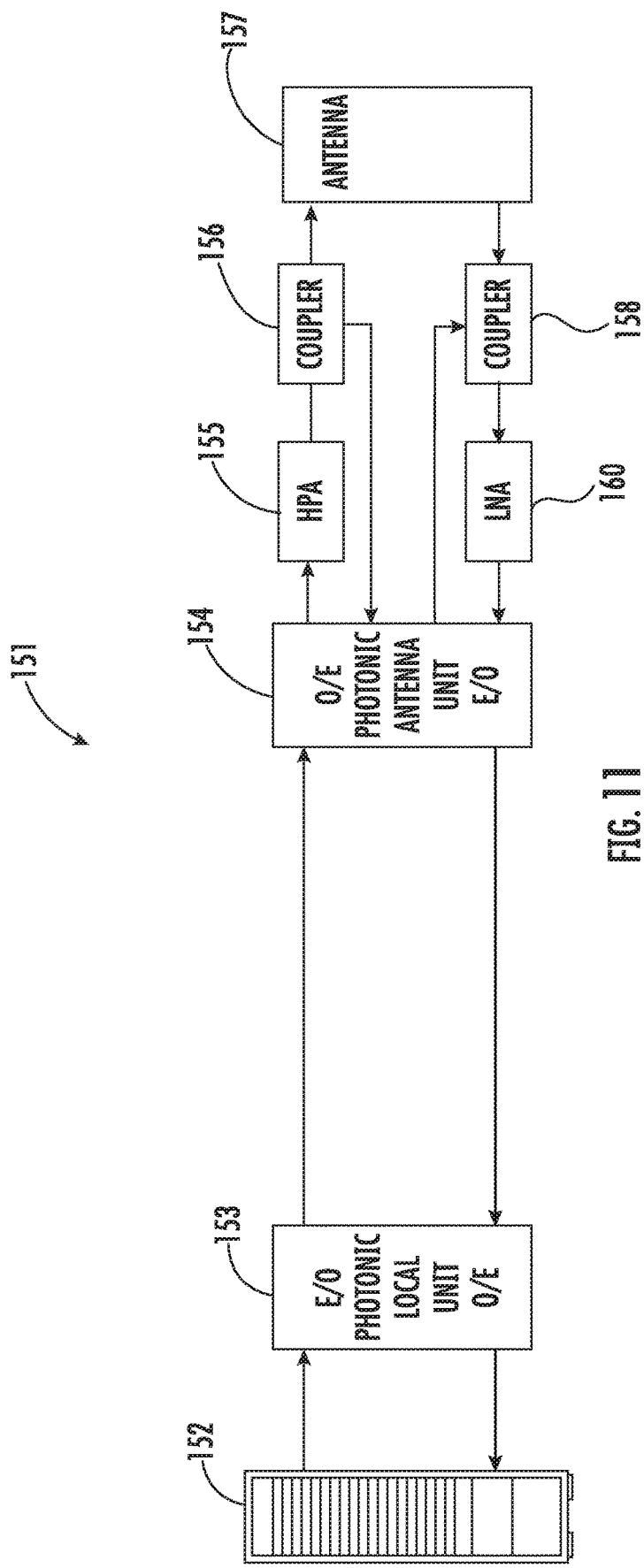
FIG. 11 is a schematic diagram of an RF system, according to an example embodiment.

Referring now to FIG. 11, an RF system 151 according to the present disclosure is now described. The RF system 151 applies the SBS equalization features of FIGS. 1-10 for frequency conversion applications, for example, remoting of EHF signals.

The RF system 151 illustratively includes a modem 152 configured to generate a transmit RF signal and process a receive RF signal. The RF system 151 comprises a photonic local unit 153 configured to convert the transmit RF signal into a transmit optical signal, and convert a receive optical signal into the receive RF signal.

The RF system 151 illustratively includes a photonic antenna unit 154 configured to convert an RF antenna signal into the receive optical signal, and convert the transmit optical signal into the transmit RF signal. The RF system 151 illustratively includes a high power amplifier 155 configured to amplify the transmit RF signal, an antenna 157, a first coupler 156 configured to route the amplified RF signal to the antenna, a second coupler 158 configured to route the receive RF signal from the antenna, and a low noise amplifier 160 configured to amplify the receive RF signal before conversion in the photonic antenna unit 154.

Figure 12:
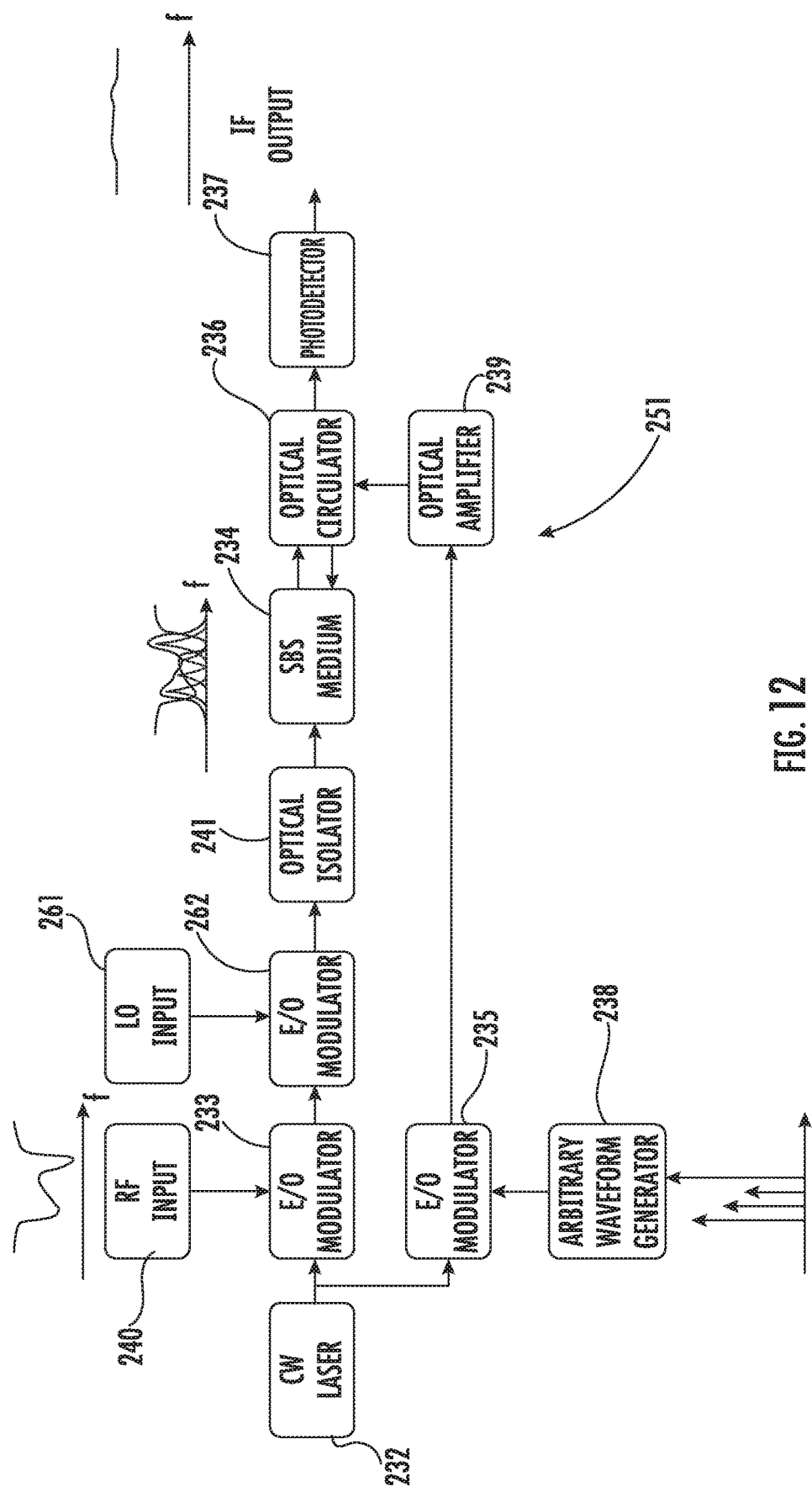
FIG. 12 is a schematic diagram of an RF frequency converter with SBS equalization, according to an example embodiment.
Figure 15A:
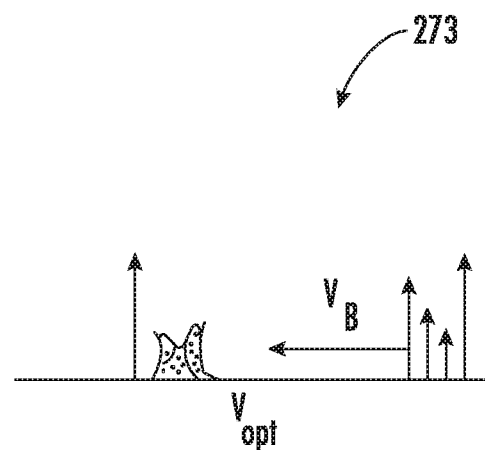
Figure 15B:
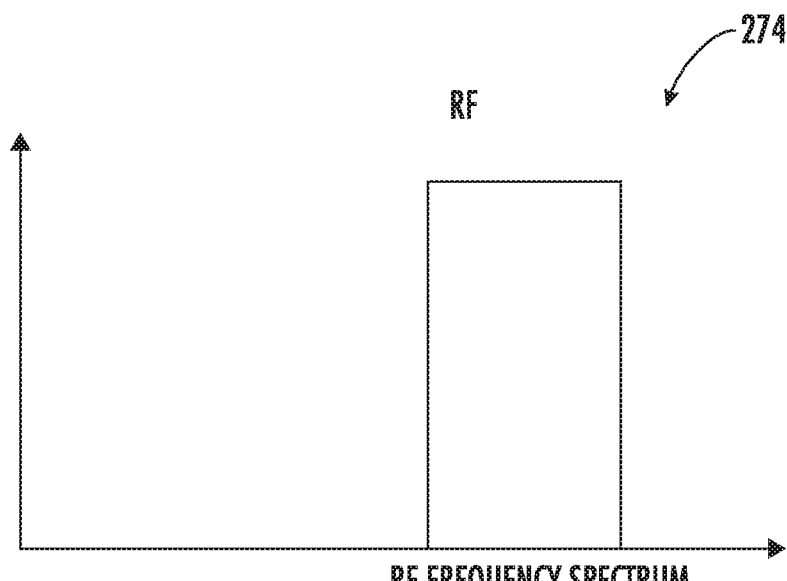
Figure 16A:
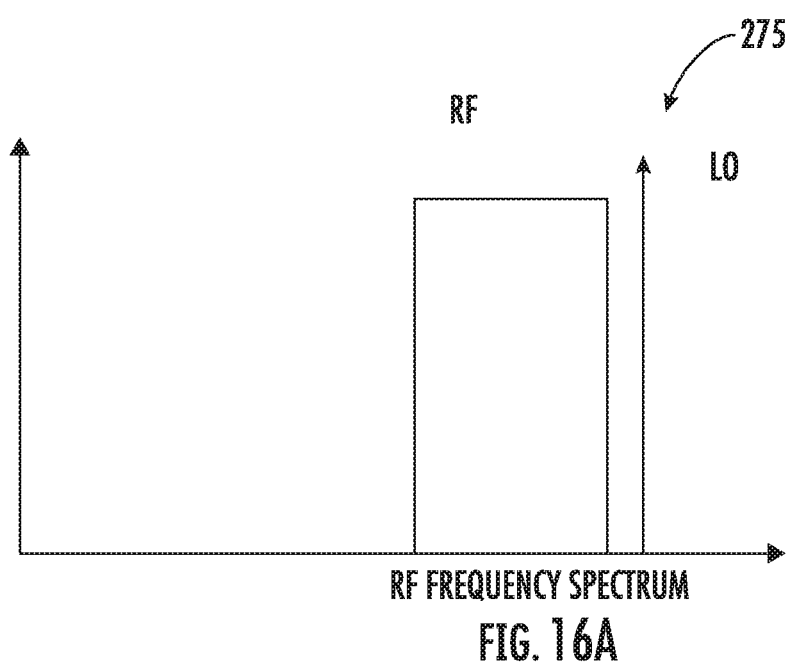
Figure 16B:
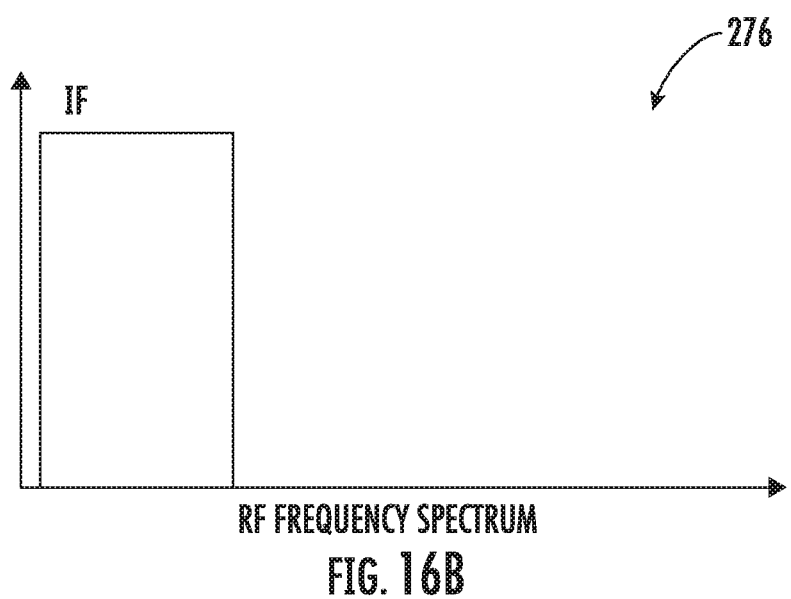

Referring now additionally to FIG. 12, an RF frequency converter 251 illustratively includes an RF input module 240 configured to generate an RF input signal. For example, the RF input module 240 may comprise an RF antenna. The RF frequency converter 251 illustratively includes a first E/O modulator 233 configured to modulate an optical carrier signal based upon the RF input signal having a first frequency, and a SBS medium 234 coupled to the first E/O modulator. The RF frequency converter 251 illustratively includes an optical source 232 configured to generate the optical carrier signal. For example, in the illustrated embodiment, the optical source 232 comprises a CW laser source.

The RF frequency converter 251 illustratively includes a second E/O modulator 235 configured to modulate the optical carrier signal based upon an equalizing function waveform. The RF frequency converter 251 illustratively includes a waveform generator 238 coupled to the second E/O modulator 235 and configured to generate the equalizing function waveform. The waveform generator 238 is configured to dynamically vary the equalizing function waveform. The waveform generator 238 is configured to add an inverse of an RF system frequency response to the RF input signal.

The RF frequency converter 251 illustratively includes a third E/O modulator 262 coupled between the first E/O modulator 233 and the SBS medium 234. The third E/O modulator 262 is configured to modulate the optical carrier signal with a reference signal. The RF frequency converter 251 illustratively includes a local oscillator 261 configured to generate the reference signal comprising a local oscillator signal.

The RF frequency converter 251 illustratively includes an optical isolator 241 coupled between the third E/O modulator 262 and the SBS medium 234. The RF frequency converter 251 illustratively includes an optical circulator 236 coupled to the SBS medium 234 and the second E/O modulator 235, and an optical amplifier 239 coupled between the second E/O modulator 235 and the optical circulator.

The RF frequency converter 251 illustratively includes a photodetector 237 coupled to the optical circulator 236 and configured to generate an equalized RF output signal comprising a replica of the RF input signal at a second frequency based upon the reference signal. In particular, the photodetector 237 is configured to generate the equalized RF output signal based upon the equalization function waveform applied to the RF input signal.

The second frequency is different than the first frequency, i.e. a frequency conversion operation. In some embodiments, the first frequency may be greater than the second frequency. In other words, the RF frequency converter 251 is operating as a downconverter. In other embodiments, the first frequency may be less than the second frequency. Here, the RF frequency converter 251 is operating as an upconverter.

Also, the RF frequency converter 251 may, in some embodiments, include a first optical filter (not shown) coupled between the third E/O modulator 262 and the photodetector 237. The RF frequency converter 251 may, in some embodiments, comprise a second optical filter (not shown) coupled between the optical amplifier 239 and the second E/O modulator 235.

Referring again to FIG. 9, another aspect is directed to a method for RF frequency converting. The method includes modulating, with a first E/O modulator 233, an optical carrier signal based upon an RF input signal having a first frequency, and modulating, with a second E/O modulator 235, the optical carrier signal based upon an equalizing function waveform. (Blocks 91-92, 94). The method comprises modulating, with a third E/O modulator 262 coupled to the first E/O modulator 233, the optical carrier signal with a reference signal. (Block 98). The method further comprises passing a modulated optical carrier signal, from the third E/O modulator 262, through a SBS medium 234, and generating, with a photodetector 237 coupled to an optical circulator 236, an equalized RF output signal comprising a replica of the RF input signal at a second frequency based upon the reference signal. (Blocks 93, 96, 97).

Referring now additionally to FIGS. 13A-16B, signal propagation and operation of the RF frequency converter 251 are now described. In diagram 270, the optical carrier signal is shown as generated by the optical source 232, and diagram 271 shows the RF input signal as generated by the RF input module 240. Once the RF input signal and the optical carrier signal are combined in the first E/O modulator 233, diagram 272 shows the resulting post-detection RF frequency spectrum of the modulated signal. As can be appreciated, the post-detection RF frequency spectrum of the modulated signal is not flat due to aforementioned frequency response of components.

Diagram 273 shows the combination of the equalizing function waveform from the waveform generator 238 combined with the RF input signal in the SBS medium 234. Diagram 274 shows the resulting post-detection RF frequency spectrum of the combined signal. Since the equalizing function waveform has been added, the post-detection RF frequency spectrum is equalized, i.e. flat.

Diagram 275 is the post-detection RF frequency spectrum after the modulated signal from the first E/O modulator 233 is modulated with the reference signal in the third E/O modulator 262. Diagram 276 is the post-detection RF frequency spectrum of the modulated signal RF output signal at the intermediate frequency.

Figure 17:
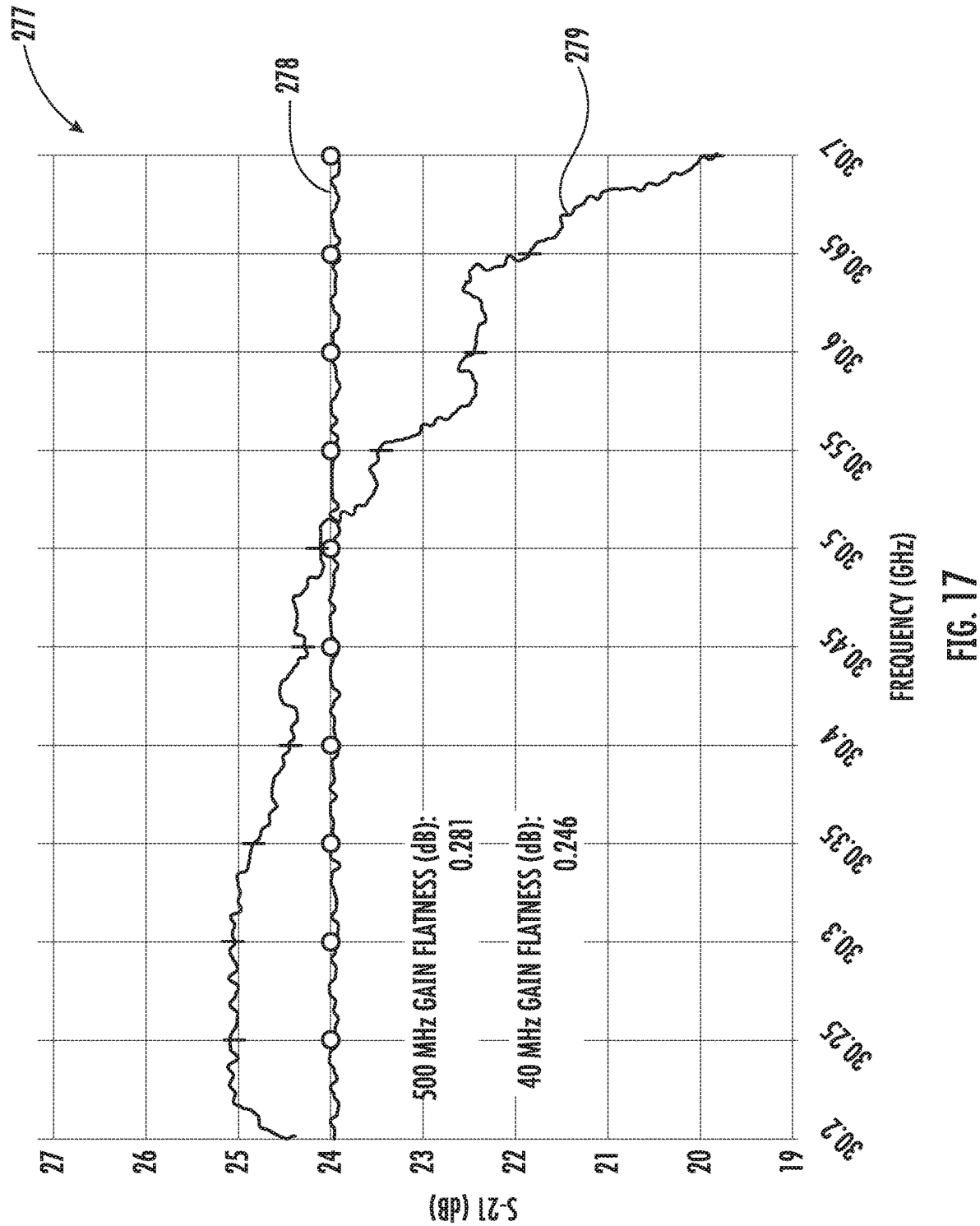
FIG. 17 is a diagram of gain performance for RF photonic uplink equalization in the RF frequency converter of FIG. 12.
Figure 18B:
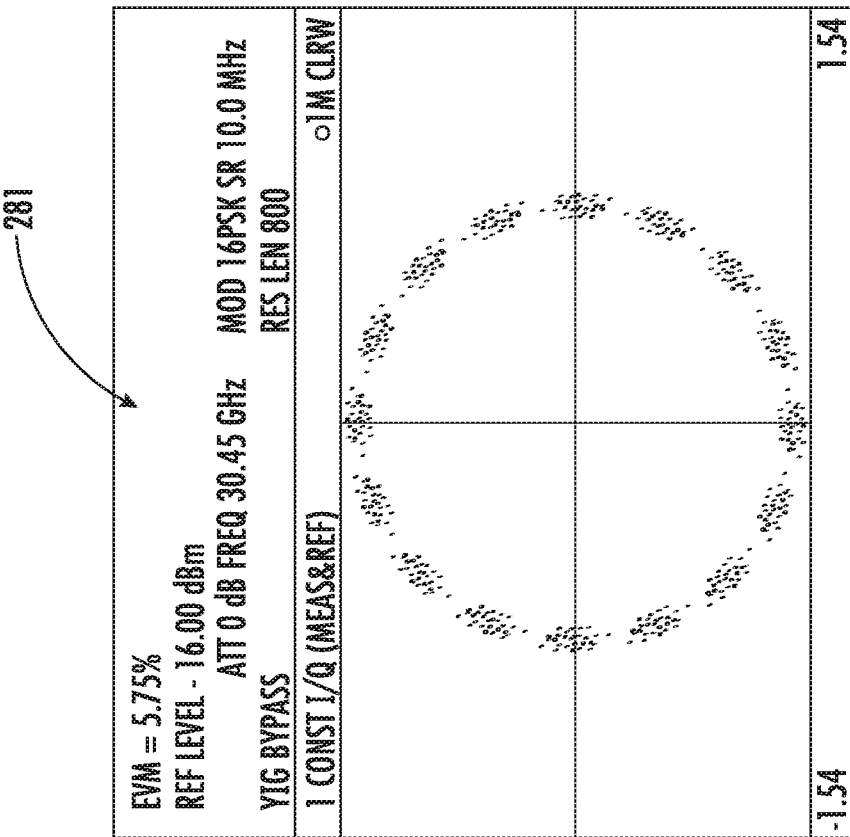
FIGS. 18A-18B are constellation diagrams in the RF frequency converter of FIG. 12 with and without RF photonic uplink equalization, respectively.
Figure 18A:
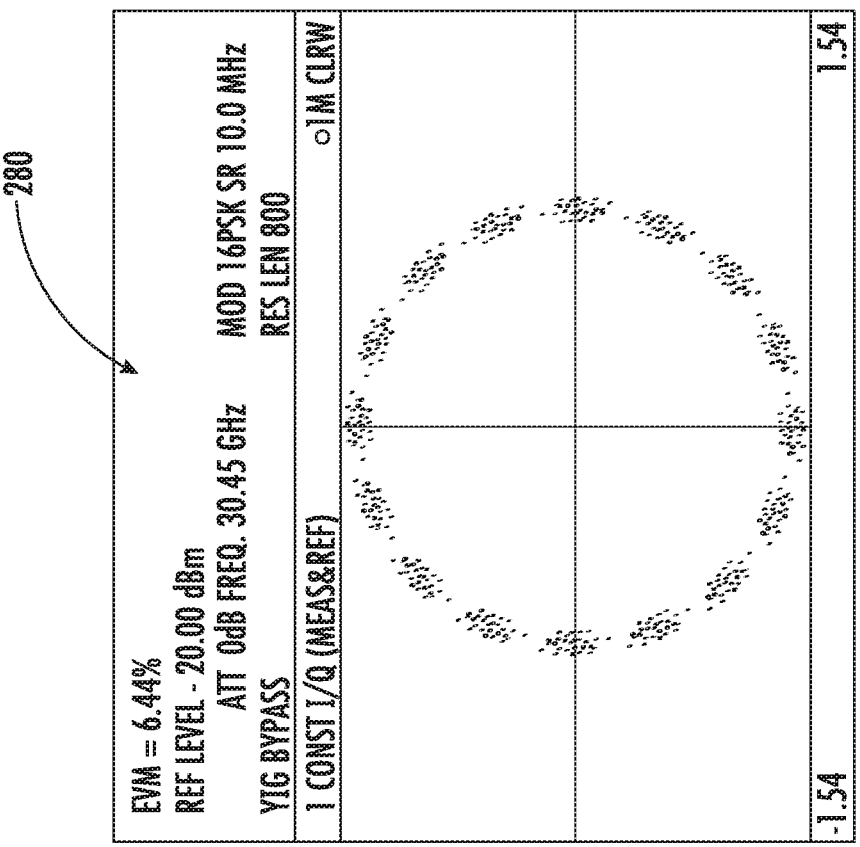
Figure 19:
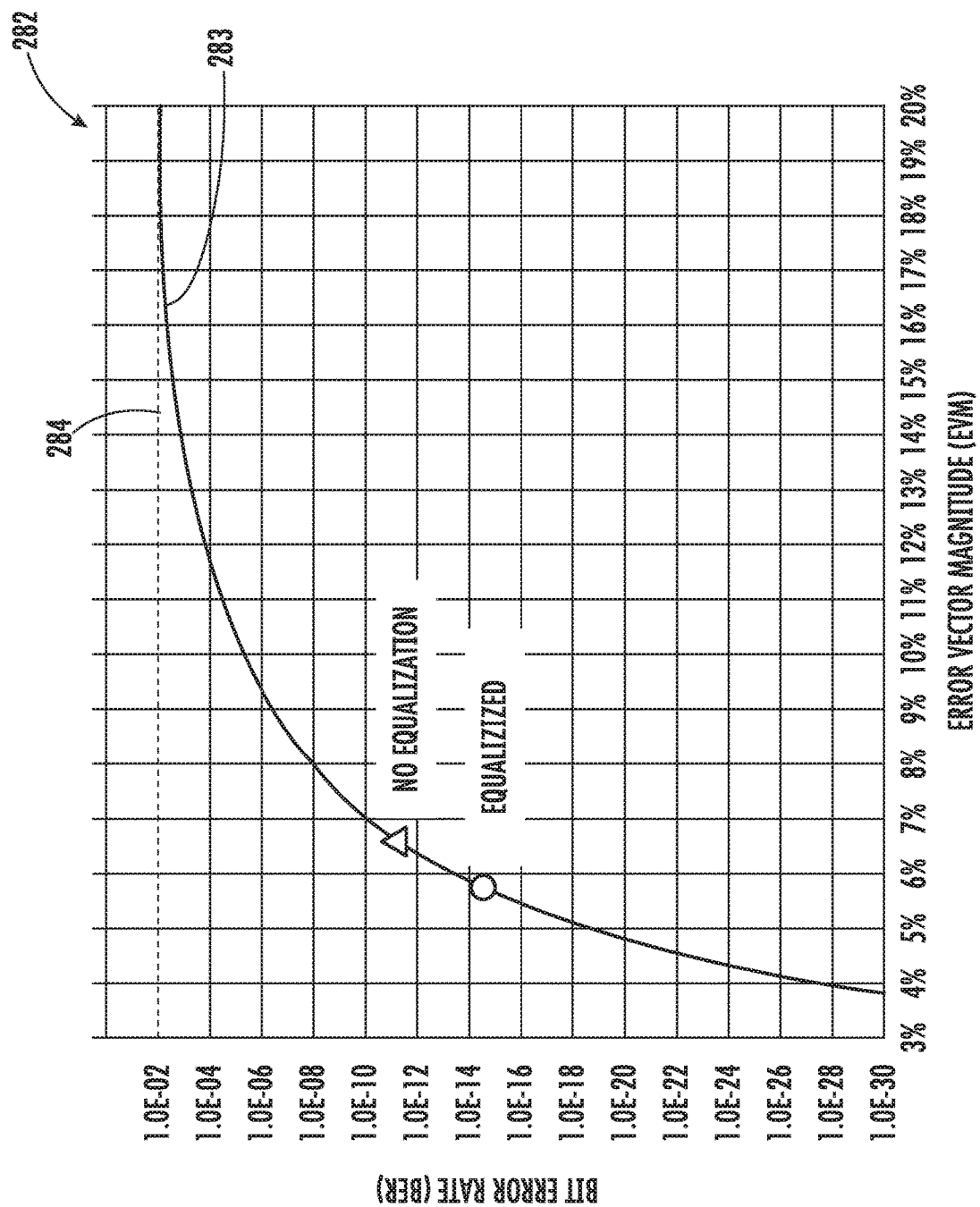
FIG. 19 is a diagram of bit error performance versus error vector magnitude for RF photonic uplink equalization in the RF frequency converter of FIG. 12.

Referring now additionally to FIGS. 17-19, several aspects of performance of the RF frequency converter 251 are now described. Diagram 277 shows gain performance for RF photonic uplink equalization in the RF frequency converter 251 in a bandwidth of 500 MHz and 40 MHz, respectively being 0.281 dB and 0.246 dB. In particular, curves 278 and 279 show gain profiles for the equalized and unequalized signals, respectively, in the RF frequency converter 251.

Constellation diagrams 280 and 281 show system performance for the unequalized and equalized signals, respectively, in the RF frequency converter 251. Constellation diagram 280 shows an error vector magnitude of 6.44%, and advantageously, constellation diagram 281 shows an error vector magnitude of 5.75%.

Diagram 282 shows error rate performance for the equalized and unequalized signals in the RF frequency converter 251. Curve 283 shows bit error rate performance for a 16-phase shift keying (PSK) modulation signal as error vector magnitude varies. Curve 284 shows a hard decision forward error correction (HD-FEC) threshold. In particular, the equalized data point (x-mark) demonstrates a lower error rate than the unequalized data point (triangle mark).

Advantageously, the RF frequency converter 251 may provide an inherently wideband approach that is tunable across frequency bands with large IBW. The RF frequency converter 251 may also provide increased dynamic range, and increased frequency resolution. Moreover, the RF frequency converter 251 is dynamically reconfigurable, and has tunable pumps. Moreover, as shown in the above performance measurements, the RF frequency converter 251 may provide for a flat gain profile with net improvement in the data channel error characteristics.

In the above embodiments, the equalizing function waveform for the RF response of the system is typically determined using network analyzer devices positioned at the local end and at the remote end (i.e. the antenna end). The network analyzer device may be costly and large, thereby onerous to deploy. Moreover, the network analyzer devices need to be calibrated, which can be difficult when the remote end is several miles away (e.g. RF antenna remoting application). In the following description, an approach to this issue is disclosed.

Figure 20:
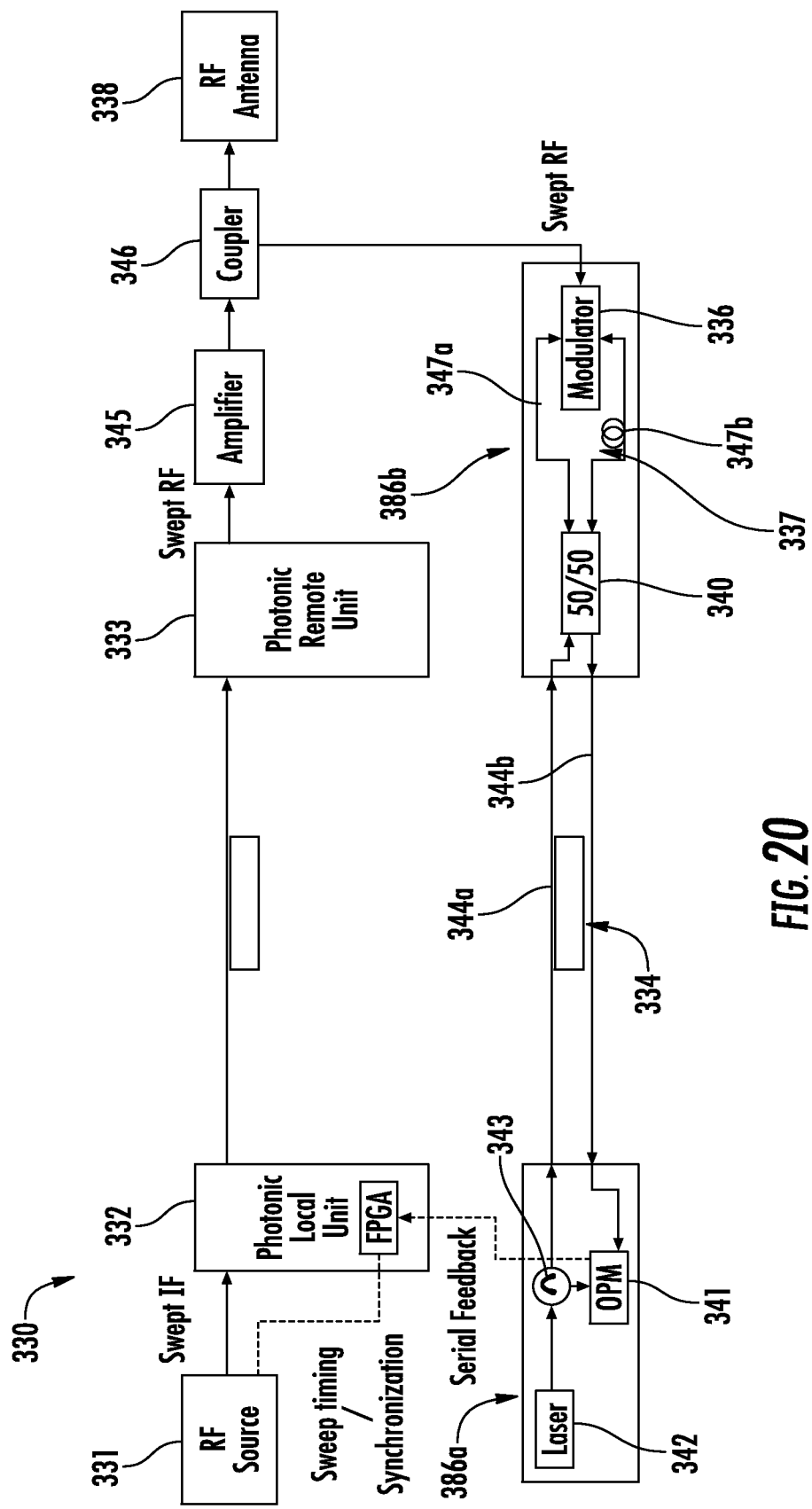
FIG. 20 is a schematic block diagram of a communication system, according to a first example embodiment.

Referring now to FIG. 20, a communication system 330 according to the present disclosure is now described. The communication system 330 illustratively includes an RF source 331 configured to generate a swept frequency RF signal, and a photonic local unit 332 coupled to the RF source and configured to generate a modulated optical carrier signal based upon the swept frequency RF signal. As will be appreciated, the photonic local unit 332 may include an optical source, and an E/O modulator for generating the modulated optical carrier signal, for example, as shown in the embodiments of FIGS. 1-19.

The photonic local unit 332 has adjustable equalization levels. In other words, the adjustable equalization levels represent the equalizing function waveform for the photonic local unit 332.

The communication system 330 illustratively comprises a photonic remote unit 333 (or photonic antenna unit) configured to generate a demodulated swept frequency RF signal from the modulated optical carrier signal from the photonic local unit 332, and an optical fiber path 334 connecting the photonic local unit and the photonic remote unit. The communication system 330 illustratively comprises an RF antenna 338 coupled to the photonic remote unit 333 and configured to transmit an RF transmit signal, and receive an RF receive signal. As will be appreciated, the photonic remote unit 333 may include a photodetector for generating the demodulated swept frequency RF signal, for example, as shown in the embodiments of FIGS. 1-19.

The communication system 330 illustratively comprises feedback circuitry 386a-386b cooperating with the optical fiber path 334 to set the adjustable equalization levels of the photonic local unit 332 based upon the demodulated swept frequency RF signal at the photonic remote unit 333. In particular, the feedback circuitry 386a-386b is configured to generate feedback information for generating the adjustable equalization levels. For example, the adjustable equalization levels may be determined using the teachings of U.S. Pat. No. 9,923,631 to Moilanen et al., the contents of which are hereby incorporated by reference in their entirety.

As will be appreciated, this embodiment of the communication system 330 is for determining the equalizing function waveform of the uplink path. In other embodiments (FIG. 21), these teachings are applied to the downlink path.

In particular, the feedback circuitry 386a-386b illustratively includes an antenna feedback unit 386b (or remote feedback unit) at the photonic remote unit 333 and a local feedback unit 386a at the photonic local unit 332. The antenna feedback unit 386b illustratively comprises an E/O modulator 336 configured to modulate an optical carrier signal based upon the demodulated swept frequency RF signal, and a Sagnac loop interferometer 337 coupled to the E/O modulator and configured to generate an optical feedback signal by suppressing sidebands of the optical carrier signal. The antenna feedback unit 386b illustratively includes an optical coupler 340 (e.g. 50/50 optical coupler) coupled to respective loops 347a-347b of the Sagnac loop interferometer 337.

Also, the local feedback unit 386a illustratively comprises an optical power meter 341 coupled to the photonic local unit 332. The local feedback unit 386a illustratively comprises a laser source 342 configured to generate the optical carrier signal, and an optical circulator 343 coupled between the laser source and the optical power meter 341.

The optical fiber path 334 illustratively comprises a first optical fiber 344a coupled between the optical coupler 340 and the optical circulator 343 and a second optical fiber 344b coupled between the optical coupler and the optical power meter 341. The first optical fiber 344a is configured to transmit the optical carrier signal to the photonic remote unit 333. The second optical fiber 344b is configured to transmit the optical feedback signal back to the photonic local unit 332.

Moreover, the communication system 330 illustratively includes an amplifier 345 (e.g. high powered amplifier in power range of 400-600 Watts) coupled downstream from the photonic remote unit, and an RF coupler 346 coupled downstream from the amplifier and configured to route the demodulated swept frequency RF signal to the RE antenna 338 and the antenna feedback unit 386*b*.

Using the swept frequency RF signal (i.e. the sweep timing and synchronization data for the swept frequency RF signal) and the optical feedback signal, the photonic local unit 332 is determining the equalizing function waveform. For example, in the illustrated embodiment, the photonic local unit 332 comprises an FPGA unit for performing the calculations. As will be appreciated, the generation of the swept frequency RF signal and the optical feedback signal may be performed periodically since the RF system frequency response changes in real time due to environmental elements, such as temperature. In some embodiments, the communication system 330 may enter a calibration mode for this method. In other embodiments, the determining of the equalizing function waveform may be performed during dead periods of communications.

In some embodiments, with the equalizing function waveform known, the photonic local unit 332 is configured to add an inverse of an RF system frequency response to an RF input signal (i.e. a predistortion application). In some other embodiments, the equalizing function waveform may be used to correct for the RF frequency response using the SBS medium teachings of the embodiments of FIGS. 1-19.

In operation, the communication system 330 uses the continuous wave RF input signal of known frequency, which is injected into the system and is converted to a known intermediate frequency (IF) in the case of a down-converter, or IF-to-RF for an up-converter. The frequency-converted signal is modulated onto the optical carrier signal within the Sagnac loop interferometer 337 using the E/O modulator 336. The E/O modulator 336 converts the RF signal into optical sidebands, and the optical power meter 341 is used to measure the amplitude of these sidebands. But the modulation process adds the sidebands onto the optical carrier signal, i.e. the laser source, and this optical carrier has a much higher power than the sidebands. However, the Sagnac loop interferometer 337 provides broadband, self-referencing optical carrier suppression, isolating the sidebands so that they can be easily measured by the optical power meter 341.

The Sagnac loop interferometer 337 is formed by sending light into a closed loop so that the light travels in both directions. Since the Sagnac loop interferometer 337 uses light that travels the same path in opposite directions, it requires no external biasing in the presence of environmental fluctuations in the path length of the interferometer. The optical coupler 340 that provides the optical input to the loop also provides the optical output, and if no asymmetry is introduced between the two paths, the light exiting one of the two output coupler ports is maximized, while the light exiting the other of the two output coupler ports is minimized. But the addition of an E/O modulator 336 adds an important change: the RF electrodes of the E/O modulator are designed as traveling wave electrodes, velocity-matched to provide optimal modulation efficiency as the RF energy interacts with the light in the optical waveguide that is placed near the electrodes. Nonetheless, the velocity matching can only be optimized in one direction; for light traveling in the reverse direction, there is very little modulation. (See, e.g., U.S. Pat. No. 9,923,631 to Moilanen et al., the contents of which are hereby incorporated by reference in their entirety).

In this manner, the optical carrier signal is suppressed by the Sagnac loop interferometer 337 because it experiences the same optical path in both directions, but the optical modulation sidebands are not suppressed, and can be measured at the output coupler with minimized light. The optical power meter 341 then measures these modulation sidebands, which correspond to the amplitude of the RF signal. Then, the RF source 331 moves to a new frequency and the measurement is repeated until the spectrum of interest has been characterized.

Advantageously, the communication system 330, 430 disclosed herein may calculate the equalizing function waveform for the RF response of the system without the network analyzer devices. Also, the approach herein may provide a wideband microwave photonic converter providing equalized total system frequency response that is arbitrarily configurable. Moreover, without the network analyzer devices, the size, weight, and power (SWAP) of the communication system 330, 430 may be reduced.

Figure 22:
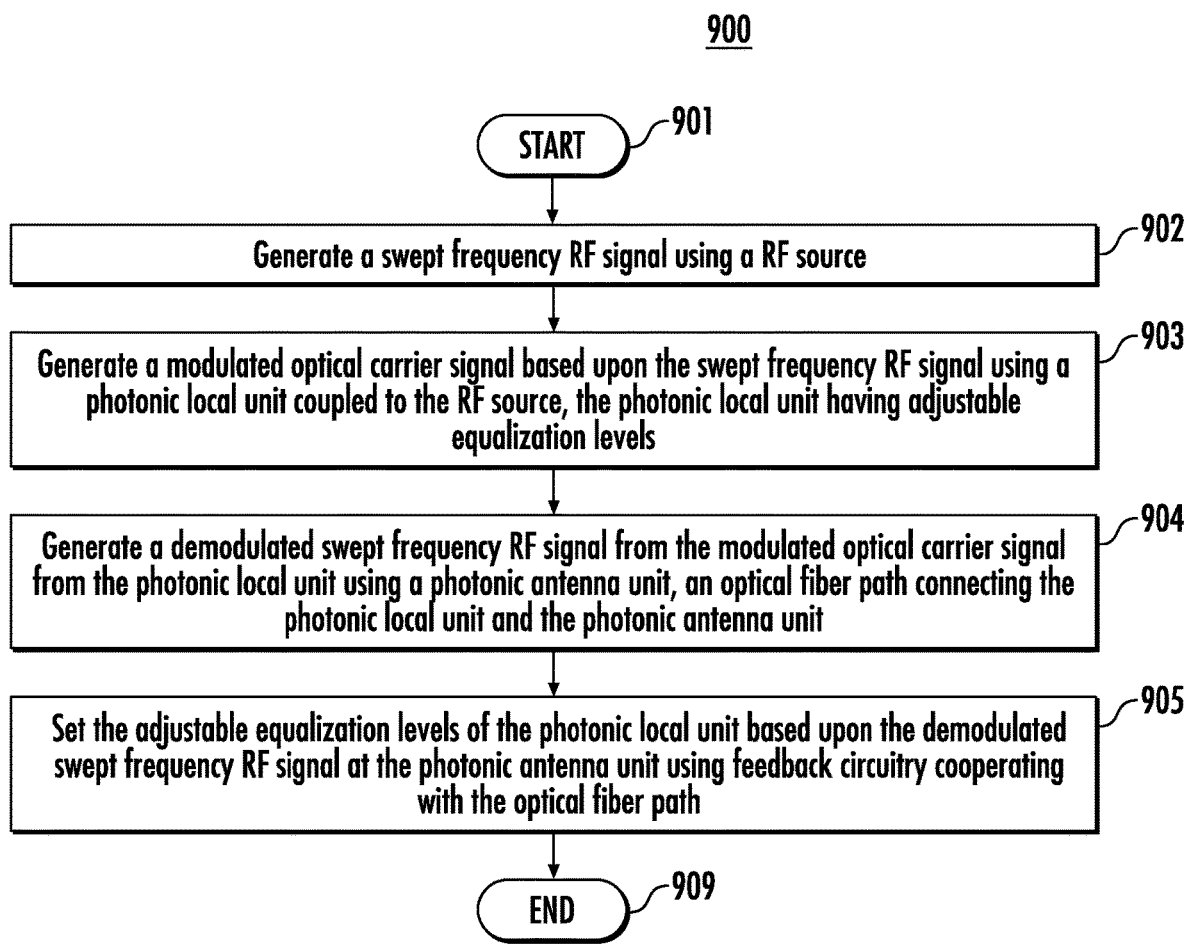
FIG. 22 is a flowchart for a method of operating the communication system of FIG. 20.

Referring now additionally to FIG. 22, a method of operating the communication system 330 is now described with reference to the flowchart 900. From the start (Block 901), the method comprises generating a swept frequency RF signal using an RF source 331, and generating a modulated optical carrier signal based upon the swept frequency RF signal using a photonic local unit 332 coupled to the RF source. (Blocks 902-903). The photonic local unit 332 has adjustable equalization levels. The method comprises generating a demodulated swept frequency RF signal from the modulated optical carrier signal from the photonic local unit using a photonic remote unit 333. (Block 904). An optical fiber path 334 connects the photonic local unit 332 and the photonic remote unit 333. The method further includes, at Block 905, setting the adjustable equalization levels of the photonic local unit 332 based upon the demodulated swept frequency RF signal at the photonic remote unit 333 using feedback circuitry 386*a*-386*b* cooperating with the optical fiber path 334, before stopping at Block 909.

Figure 21:
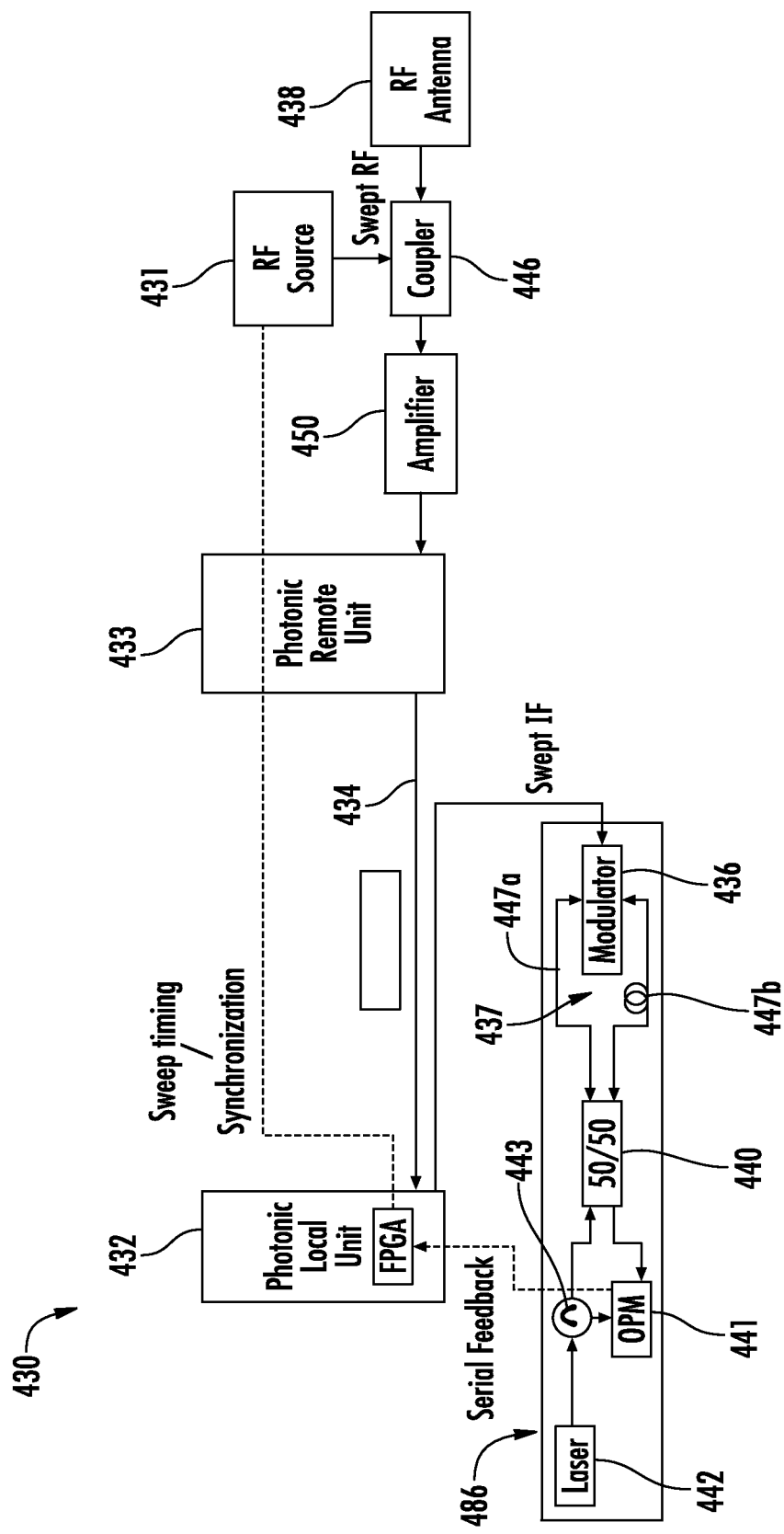
FIG. 21 is a schematic block diagram of a communication system, according to a second example embodiment.

Referring now additionally to FIG. 21, another embodiment of the communication system 430 is now described. In this embodiment of the communication system 430, those elements already discussed above with respect to FIG. 20 are incremented by 100 and most require no further discussion herein. This embodiment differs from the previous embodiment in that this communication system 430 illustratively includes an RF source 431 configured to generate a swept frequency RF signal, and a photonic remote unit 433 coupled to the RF source and configured to generate a modulated optical carrier signal based upon the swept frequency RF signal. As will be appreciated, the photonic remote unit 433 may include an optical source, and an E/O modulator for generating the modulated optical carrier signal, for example, as shown in the embodiments of FIGS. 1-19.

The communication system 430 illustratively comprises a photonic local unit 432 configured to generate a demodulated swept frequency RF signal from the modulated optical carrier signal from the photonic remote unit 433. As will be appreciated, the photonic local unit 432 may include a photodetector for generating the demodulated swept frequency RF signal, for example, as shown in the embodiments of FIGS. 1-19.

The photonic local unit 432 has adjustable equalization levels. In other words, the adjustable equalization levels represent the equalizing function waveform for the photonic local unit 432.

The communication system 430 illustratively includes an optical fiber path 434 connecting the photonic local unit 432 and the photonic remote unit 433, and feedback circuitry 486 cooperating with the optical fiber path to set the adjustable equalization levels of the photonic local unit 432 based upon the demodulated swept frequency RF signal at the photonic local unit. In this embodiment, the feedback circuitry 486 is located at the photonic local unit 432. As will be appreciated, this embodiment of the communication system 430 is for determining the equalizing function waveform of the downlink path.

The feedback circuitry 486 illustratively comprises an E/O modulator 436 configured to modulate an optical carrier signal based upon the demodulated swept frequency RF signal, and a Sagnac loop interferometer 437 coupled to the E/O modulator and configured to generate an optical feedback signal by suppressing sidebands of the optical carrier signal. The feedback circuitry 486 illustratively includes an optical coupler 440 coupled to respective loops 447a-447b of the Sagnac loop interferometer 437.

The feedback circuitry 486 illustratively comprises an optical power meter 441 coupled to the photonic local unit 432. The feedback circuitry 486 illustratively includes a laser source 442 configured to generate the optical carrier signal, and an optical circulator 443 coupled between the laser source and the optical power meter 441.

Also, the communication system 430 illustratively comprises an amplifier 450 (e.g. a low noise amplifier (LNA)) coupled downstream from the RF source 431, and an RF coupler 446 coupled downstream from the amplifier and configured to route the swept frequency RF signal to the photonic remote unit 433. The photonic local unit 432 is configured to add an inverse of an RF system frequency response to an RF input signal. The photonic local unit 432 is configured to transmit timing and synchronization data for the swept frequency RF signal to the RF source 431.

Figure 23:
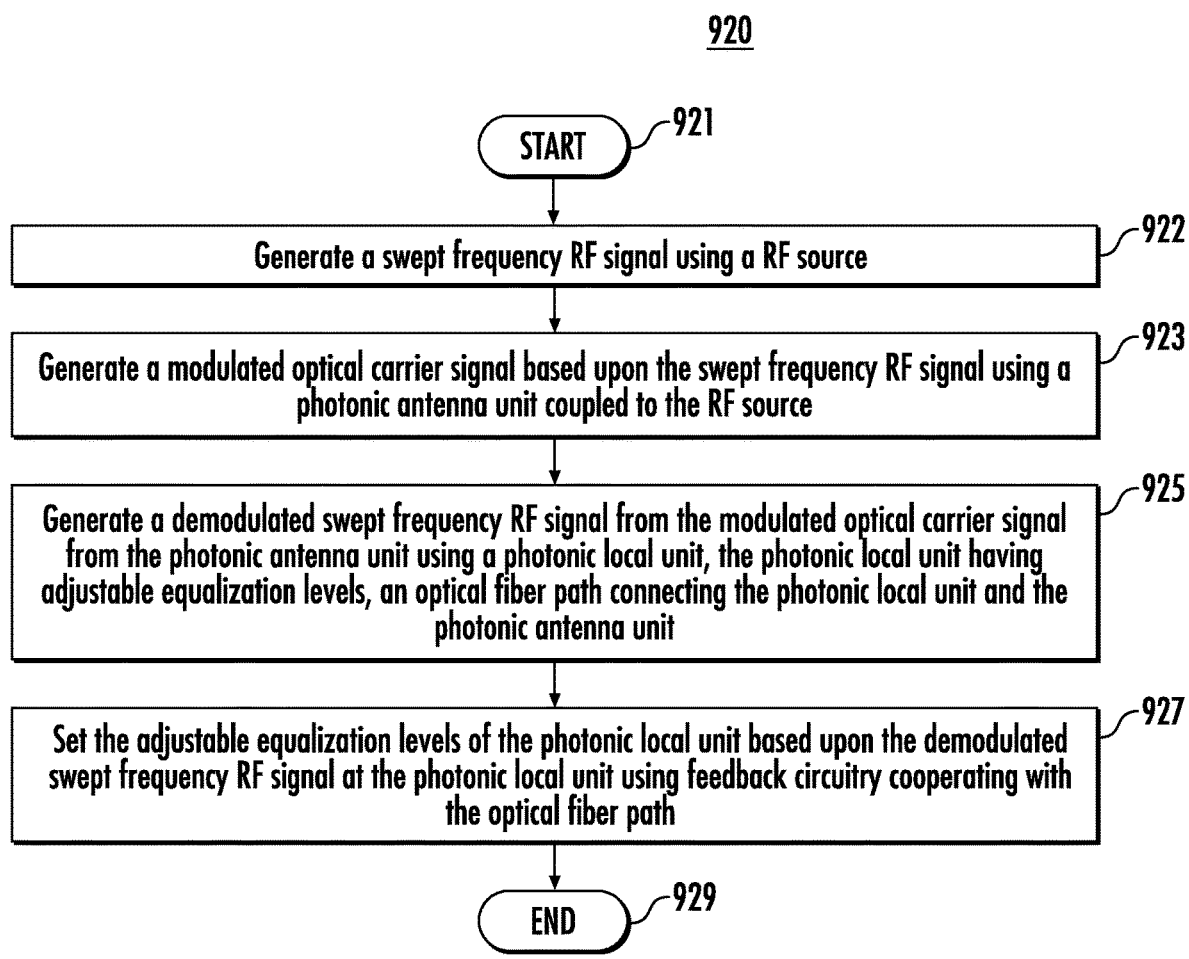
FIG. 23 is a flowchart for a method of operating the communication system of FIG. 21.

Referring now additionally to FIG. 23, a method of operating the communication system 430 is now described with reference to the flowchart 920. From the start at Block 921, the method comprises generating a swept frequency RF signal using an RF source 431, and generating a modulated optical carrier signal based upon the swept frequency RF signal using a photonic remote unit 433 coupled to the RF source. (Blocks 922-923). The method comprises generating a demodulated swept frequency RF signal from the modulated optical carrier signal from the photonic remote unit 433 using a photonic local unit 432. (Block 925). The photonic local unit 432 has adjustable equalization levels. An optical fiber path 434 connects the photonic local unit 432 and the photonic remote unit 433. The method comprises, at Block 927, setting the adjustable equalization levels of the photonic local unit 432 based upon the demodulated swept frequency RF signal at the photonic local unit using feedback circuitry 486 cooperating with the optical fiber path 434 before ending at Block 929.

Other features relating to frequency conversion and equalization are disclosed in U.S. Pat. Nos. 8,842,992 & 9,967,031 to Middleton et al. and patent application Ser. No. 15/958,397 to Middleton et al. & Ser. No. 16/280,182 to Middleton et al., which are incorporated herein by reference in their entirety.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A communication system comprising:
    a radio frequency (RF) source configured to generate a swept frequency RF signal;
    a photonic local unit coupled to said RF source and configured to generate a modulated optical carrier signal based upon the swept frequency RF signal, said photonic local unit having adjustable equalization levels;
    a photonic remote unit configured to generate a demodulated swept frequency RF signal from the modulated optical carrier signal from said photonic local unit;
    an optical fiber path connecting said photonic local unit and said photonic remote unit;
    feedback circuitry cooperating with said optical fiber path to set the adjustable equalization levels of said photonic local unit based upon the demodulated swept frequency RF signal at said photonic remote unit;
    an RF antenna coupled to said photonic remote unit;
    an amplifier coupled downstream from said photonic remote unit; and
    an RF coupler coupled downstream from said amplifier and configured to route the demodulated swept frequency RF signal to said RF antenna and said feedback circuitry.

2. The communication system of claim 1 further comprising an RF antenna coupled to said photonic remote unit.

3. The communication system of claim 1 wherein said feedback circuitry comprises an antenna feedback unit at said photonic remote unit and a local feedback unit at said photonic local unit.

4. The communication system of claim 3 wherein said antenna feedback unit comprises:
    an electro-optic (E/O) modulator configured to modulate an optical carrier signal based upon the demodulated swept frequency RF signal; and
    a Sagnac loop interferometer coupled to said E/O modulator and configured to generate an optical feedback signal by suppressing sidebands of the optical carrier signal.

5. The communication system of claim 4 wherein said antenna feedback unit comprises an optical coupler coupled to respective loops of said Sagnac loop interferometer.

6. The communication system of claim 5 wherein said local feedback unit comprises an optical power meter coupled to said photonic local unit.

7. The communication system of claim 6 wherein said local feedback unit comprises a laser source configured to generate the optical carrier signal, and an optical circulator coupled between said laser source and said optical power meter.

8. The communication system of claim 7 wherein said optical fiber path comprises a first optical fiber coupled between said optical coupler and said optical circulator and a second optical fiber coupled between said optical coupler and said optical power meter.

9. The communication system of claim 1 wherein said photonic local unit is configured to add an inverse of an RF system frequency response to an RF input signal.

10. A communication system comprising:
    a radio frequency (RF) source configured to generate a swept frequency RF signal;

a photonic remote unit coupled to said RF source and configured to generate a modulated optical carrier signal based upon the swept frequency RF signal;

a photonic local unit configured to generate a demodulated swept frequency RF signal from the modulated optical carrier signal from said photonic remote unit, said photonic local unit having adjustable equalization levels;

an optical fiber path connecting said photonic local unit and said photonic remote unit; and feedback circuitry cooperating with said optical fiber path to set the adjustable equalization levels of said photonic local unit based upon the demodulated swept frequency RF signal at said photonic local unit;

said feedback circuitry comprising an electro-optic (E/O) modulator configured to modulate an optical carrier signal based upon the demodulated swept frequency RF signal, a Sagnac loop interferometer coupled to said E/O modulator and configured to generate an optical feedback signal by suppressing sidebands of the optical carrier signal, and an optical power meter coupled to said photonic local unit.

11. The communication system of claim 10 further comprising an RF antenna coupled to said photonic remote unit.

12. The communication system of claim 10 wherein said feedback circuitry comprises an optical coupler coupled to respective loops of said Sagnac loop interferometer.

13. The communication system of claim 10 wherein said feedback circuitry comprises a laser source configured to generate the optical carrier signal, and an optical circulator coupled between said laser source and said optical power meter.

14. The communication system of claim 10 further comprising an amplifier coupled downstream from said RF source, and an RF coupler coupled downstream from said amplifier and configured to route the swept frequency RF signal to said photonic remote unit.

15. The communication system of claim 10 wherein said photonic local unit is configured to add an inverse of an RF system frequency response to an RF input signal.

16. The communication system of claim 10 wherein said photonic local unit is configured to transmit timing and synchronization data for the swept frequency RF signal to said RF source.

17. A method of operating a communication system, the method comprising:

generating a swept frequency radio frequency (RF) signal using an RF source;

generating a modulated optical carrier signal based upon the swept frequency RF signal using a photonic local unit coupled to the RF source, the photonic local unit having adjustable equalization levels;

generating a demodulated swept frequency RF signal from the modulated optical carrier signal from the photonic local unit using a photonic remote unit, an optical fiber path connecting the photonic local unit and the photonic remote unit;

setting the adjustable equalization levels of the photonic local unit based upon the demodulated swept frequency RF signal at the photonic remote unit using feedback circuitry cooperating with the optical fiber path; and generating an optical carrier signal using a laser source, and routing the optical carrier signal using an optical circulator coupled between the laser source and an optical power meter;

wherein using feedback circuitry comprises modulating the optical carrier signal based upon the demodulated swept frequency RF signal using an electro-optic (E/O) modulator, and generating an optical feedback signal by suppressing sidebands of the optical carrier signal using a Sagnac loop interferometer coupled to the E/O modulator.

18. The method of claim 17 further comprising generating an RF transmit signal using an RF antenna coupled to the photonic remote unit.

19. The method of claim 17 further comprising adding an inverse of an RF system frequency response to an RF input signal using the photonic local unit.

20. A method of operating a communication system, the method comprising:

generating a swept frequency radio frequency (RF) signal using an RF source;

generating a modulated optical carrier signal based upon the swept frequency RF signal using a photonic remote unit coupled to the RF source;

generating a demodulated swept frequency RF signal from the modulated optical carrier signal from the photonic remote unit using a photonic local unit, the photonic local unit having adjustable equalization levels, an optical fiber path connecting the photonic local unit and the photonic remote unit; and setting the adjustable equalization levels of the photonic local unit based upon the demodulated swept frequency RF signal at the photonic local unit using feedback circuitry cooperating with the optical fiber path; and generating an optical carrier signal using a laser source, and routing the optical carrier signal using an optical circulator coupled between the laser source and an optical power meter;

wherein using feedback circuitry comprises modulating the optical carrier signal based upon the demodulated swept frequency RF signal using an electro-optic (E/O) modulator, and generating an optical feedback signal by suppressing sidebands of the optical carrier signal using a Sagnac loop interferometer coupled to the E/O modulator.

21. The method of claim 20 further comprising receiving an RF receive signal using an RF antenna coupled to the photonic remote unit.

22. The method of claim 20 further comprising adding an inverse of an RF system frequency response to an RF input signal using the photonic local unit.

23. The method of claim 20 further comprising transmitting timing and synchronization data for the swept frequency RF signal to the RF source using the photonic local unit.

24. A communication system comprising:

a radio frequency (RF) source configured to generate a swept frequency RF signal;

a photonic local unit coupled to said RF source and configured to generate a modulated optical carrier signal based upon the swept frequency RF signal, said photonic local unit having adjustable equalization levels;

a photonic remote unit configured to generate a demodulated swept frequency RF signal from the modulated optical carrier signal from said photonic local unit;

an optical fiber path connecting said photonic local unit and said photonic remote unit;

feedback circuitry cooperating with said optical fiber path to set the adjustable equalization levels of said photonic local unit based upon the demodulated swept frequency RF signal at said photonic remote unit;

said feedback circuitry comprising an antenna feedback unit at said photonic remote unit and a local feedback unit at said photonic local unit;

said antenna feedback unit comprising
- an electro-optic (E/O) modulator configured to modulate an optical carrier signal based upon the demodulated swept frequency RF signal,
- a Sagnac loop interferometer coupled to said E/O modulator and configured to generate an optical feedback signal by suppressing sidebands of the optical carrier signal, and
- an optical coupler coupled to respective loops of said Sagnac loop interferometer;

said local feedback unit comprising an optical power meter coupled to said photonic local unit.

* * * * *